(12) United States Patent
Wakabayashi et al.

(10) Patent No.: US 7,756,183 B2
(45) Date of Patent: Jul. 13, 2010

(54) LINE NARROWED LASER APPARATUS

(75) Inventors: Osamu Wakabayashi, Kanagawa (JP);
Takahito Kumazaki, Kanagawa (JP)

(73) Assignees: Komatsu Ltd, Tokyo (JP); Ushio Inc., Tokyo (JP)

( * ) Notice: Subject to any disclaimer, the term of this patent is extended or adjusted under 35 U.S.C. 154(b) by 0 days.

(21) Appl. No.: 11/453,519

(22) Filed: Jun. 15, 2006

(65) Prior Publication Data

US 2007/0014326 A1 Jan. 18, 2007

(30) Foreign Application Priority Data

Jun. 29, 2005 (JP) ............... 2005-190368

(51) Int. Cl.
*H01S 3/09* (2006.01)
*H01S 3/10* (2006.01)
(52) U.S. Cl. .......................... 372/69; 372/20
(58) Field of Classification Search .................. 372/69, 372/20, 98–100
See application file for complete search history.

(56) References Cited

U.S. PATENT DOCUMENTS

| 4,862,467 | A | * | 8/1989 | Carter et al. ................... 372/18 |
| 5,450,434 | A | * | 9/1995 | Ota et al. ....................... 372/57 |
| 6,212,217 | B1 | | 4/2001 | Erie et al. |
| 6,526,086 | B1 | * | 2/2003 | Wakabayashi et al. ........ 372/69 |
| 6,721,340 | B1 | | 4/2004 | Fomenkov et al. |
| 2002/0141471 | A1 | * | 10/2002 | Aab et al. ..................... 372/57 |
| 2006/0023277 | A1 | * | 2/2006 | Clar et al. ..................... 359/9 |

FOREIGN PATENT DOCUMENTS

| JP | 2000-312048 | 11/2000 |
| JP | 2001-267673 | 9/2001 |

* cited by examiner

*Primary Examiner*—Minsun Harvey
*Assistant Examiner*—Patrick Stafford
(74) *Attorney, Agent, or Firm*—Husch Blackwell Sanders Welsh & Katz

(57) ABSTRACT

The control of the spectral purity width E95 is performed while imparting practically no effect to the control of a central wavelength, and the spectral purity width E95 is stabilized. A wavefront adjuster 32 is provided on an output side of the interior of an optical resonator, i.e., on an output coupler 31 side. Light generated in a laser chamber 10 is transmitted through the wavefront adjuster 32 from the laser chamber 10 side, and reaches the output coupler 31. In the wavefront adjuster 32, the distance between concave and convex lenses 33 and 34 is adjusted so that a desired spectral purity width E95 can be obtained. Then, when the light passes through the wavefront adjuster 32, the wavefront of the light is adjusted to a desired wavefront.

12 Claims, 26 Drawing Sheets

LINE NARROWED LASER APPARATUS

BACKGROUND OF THE INVENTION

1. Field of the Invention

The present invention relates to a line narrowed laser apparatus, and more particularly to a line narrowed excimer laser apparatus or a line narrowed F2 laser apparatus serving as a light source of a reduction projection exposure tool used to the manufacture of a semiconductor, wherein a spectral index value such as the spectral purity width of the laser light is controlled.

2. Related Art

Hereafter, a description will be given of respective items of conventional techniques of the line narrowed laser apparatus used as a light source of a reduction projection exposure tool.

(Light Source for Exposure)

In conjunction with trends toward finer patterning and higher integration of semiconductor integrated circuits, there has been a demand for improvement of resolution in semiconductor exposure tools. For this reason, attempts are underway to shorten the wavelength of light emitted from a light source for exposure, and a gas laser apparatus instead of a conventional mercury lamp has come to be used as the light source for exposure. As the present gas laser apparatuses for exposure, KrF excimer laser apparatuses emitting ultraviolet rays with a wavelength of 248 nm and ArF excimer laser apparatuses emitting ultraviolet rays with a wavelength of 193 nm are used. As a next-generation exposure technique, it has been conceived to apply to the ArF exposure a liquid immersion technique in which a space between an exposure lens and a wafer is filled with a liquid to change the refractive index, and the apparent wavelength of the exposure light source is thereby shortened. In the ArF liquid immersion, the apparent wavelength becomes a short 134-nm wavelength. In addition, as a next-generation light source for exposure, an F2 laser apparatus for emitting ultraviolet rays with a wavelength of 157 is a promising candidate, and there is a possibility of the F2 laser liquid immersion exposure being adopted. It is said that the wavelength is shortened down to 115 nm in the F2 liquid immersion. (Optical Elements for Exposure and Chromatic Aberration).

(Optical Elements for Exposure and Chromatic Aberration)

A projection optical system is adopted as the optical system of most semiconductor exposure tools. In the projection optical system, chromatic aberration correction is performed by combining optical elements such as lenses having different refractive indexes. At present, in the wavelength region of 248 nm to 115 nm of the laser, i.e., a light source for exposure, there are no other optical materials suitable for use as lens materials of the projection optical system than fused silica and CaF2. For this reason, a monochromatic lens of a total refraction type constituted by fused silica alone is adopted as the projection lens of the KrF excimer laser, while a partially achromatic lens of a total refraction type constituted by fused silica and CaF2 is adopted as the projection lens of the ArF excimer laser. However, since the free-running spectral widths of the KrF and ArF excimer lasers are wide at approximately 350 to 400 pm, chromatic aberration occurs if these projection lenses are used, so that the resolution declines. Accordingly, the spectral line width of the laser light emitted from the gas laser apparatus needs to be narrowed to such an extent that the chromatic aberration can be ignored. For this reason, a line narrowing module having line narrowing elements (such as an etalon and a grating) is provided in an optical resonator of the laser apparatus so as to narrow the spectral line width. (Spectral Purity Width).

(Spectral Purity Width)

The image forming performance of the exposure tool is largely affected by not only the full width at half maximum of the spectral profile of the laser light but also a tail component of the spectral profile. Accordingly, a new index value of the spectrum which is called the spectral purity width has been introduced. This spectral purity width is evaluated by the spectral width (E95) in which 95% of the total energy is concentrated.

To ensure the quality of the integrated circuit, it is required to keep this spectral purity width down to, for example, 0.5 pm or less.

(Reasons for Stabilizing the Spectral Purity Width)

However, in recent years it has come to be said that there are cases where the quality of the integrated circuits can deteriorate even if this spectral purity width is substantially narrower than the width designed for an optical system. This is described in U.S. Pat. No. 6,721,340 and JP-A-2001-267673. For this reason, this spectral purity width needs to be controlled so as to be stabilized within a predetermined allowable width.

(Conventional Techniques for Controlling Spectral Purity Width)

As techniques for controlling the spectral purity width, a method based on wavelength shifting and a method based on grating bending control have been disclosed.

Techniques for stabilizing and controlling the spectral purity width on the basis of wavelength shifting are disclosed in U.S. Pat. No. 6,721,340 and JP-A-2001-267673. JP-A-2001-267673 discloses an invention wherein a wavelength detector is provided, and a fast tuning mechanism is provided in a line narrowing unit, and wherein on the basis of the detected wavelength, the wavelength is shifted by a very small degree at a fast speed for each pulse by the fast tuning mechanism, thereby controlling the apparent spectral purity width and keeping it within an allowable range. The phrase "controlling the apparent spectral purity width" referred to herein means control whereby the central wavelength is shifted at each moment and subjected to time integration, to thereby artificially obtain a spectral purity width corresponding to a margin of the shift.

A technique for stabilizing and controlling the spectral line width (including the purity width) on the basis of grating bending control is disclosed in JP-A-2000-312048. This JP-A-2000-312048 concerns a mechanism for precisely bending a grating of a wavelength selecting element in a line narrowing module, and a grating assembly for controlling a bidirectional spectral bandwidth. A description will be given of this technique with reference to FIG. 26.

FIG. 26 shows the grating bending mechanism for controlling the spectral purity width.

A spring housing 91 is connected to one end plate 92 of two end plates 92 extending in a direction away from a line surface of a grating 90. An adjustment rod 94 is screwed into the other end plate 93 and is inserted into the spring housing 91. Further, the adjustment rod 94 is fixed to a piston 95 provided in the spring housing 91. A compression spring 96 attached between one pressure surface 91a of the interior of the spring housing 91 and one surface of the piston 95 and a compression spring 97 attached between the other pressure surface 91b of the interior of the spring housing 91 and the other surface of the piston 95 are present in the spring housing 91. If the adjustment rod 94 is rotated in one direction, the concave shape of the line surface of the grating 90 becomes larger (or the convex shape becomes smaller), whereas if the adjustment rod 94 is rotated in the other direction, the convex shape of the line surface of the grating 90 becomes larger (or the concave shape becomes smaller). By the use of this grating bending mechanism, the spectral line width and the spectral purity width E95 can be controlled to some extent within a certain range.

However, with the conventional technique described in the aforementioned JP-A-2001-267673, in conjunction with the control of the spectral purity width, the central wavelength also changes concomitantly. For this reason, it is difficult to independently perform the central wavelength control for allowing the central wavelength to agree with a desired value and the spectral line width control for keeping the spectral purity width within a predetermined allowable range. For this reason, the following problems occur.

(1) In the control of the central wavelength, it is desirable to perform feedback control for each pulse, but this involves complex control.
(2) In a situation in which the central wavelength is stable, the accuracy of the central wavelength control does not present a major problem. However, in a case where there is a need to dynamically control the wavelength such as when an instruction on the change of a target wavelength is given from an exposure tool, there is a possibility of affecting the accuracy of the central wavelength control.
(3) In an initial period of a burst oscillation, a chirping phenomenon occurs in which the central frequency substantially deviates.

Furthermore, with the conventional technique described in JP-A-2000-312048, if an attempt is made to control the spectral line width to a target spectral purity width E95 by controlling the grating bending; the following problems occur.

(1) The control range of the spectral purity width which is capable of maintaining a state in which the laser output is maintained is between approximately 0.4 and 0.6 pm, and the dynamic range is small. For this reason, it is only possible to set the target value of the spectral purity width E95 in the vicinity of 0.5 pm (the details of this aspect will be described later). Moreover, in cases where the range of ±0.1 pm has been exceeded due to the effect of such as a thermal load and acoustic waves, the stabilization of the spectral purity width E95 is difficult.
(2) The bending of the grading for varying the spectral purity width is greatly enlarged by a prism beam expander, the bending needs to be effected very finely on a circular arc with a long radius of curvature (e.g., several kilometers or thereabouts). If the grating cannot be bent finely, a large effect is exerted on the spectral profile. For example, there are cases where a plurality of peaks are generated.
(3) The size of the grating used in the line narrowed excimer laser apparatus for an exposure tool is very large (with a length of 200 mm to 350 mm), and the grating bending mechanism is very precise. Therefore, the grating bending mechanism is not suitable for fast control of the spectral purity width E95.

As described above, there are various problems in performing the control of the spectral purity width E95 by the waveform shifting and grating bending, and it has been difficult to effect the control of the spectral purity width E95 in a wide control range while imparting practically no effect to the control of the central wavelength.

The present invention has been devised in view of the above-described circumstances, and its object is to allow the control of the spectral purity width E95 to be performed while imparting practically no effect to the control of the central wavelength, and stabilize the spectral purity width E95.

SUMMARY OF THE INVENTION

In accordance with a first aspect of the invention, there is provided a line narrowed laser apparatus comprising:

a laser medium, an exciting source for exciting the laser medium;

an optical resonator having a wavelength dispersive element for dispersing light into wavelengths and a partial transmission-type output coupler which reflects a portion of the light made incident and transmits a remaining portion thereof, the optical resonator being adapted to resonate the outputted light due to the excitation of the laser medium; and a wavefront adjuster disposed on an optical axis on an output side of an interior of the optical resonator to adjust a wavefront of the light outputted from the laser medium.

Referring to FIG. 1, a description will be given of the first aspect of the invention. For example, a laser gas 1 is sealed in a laser chamber 10 as the laser medium, and discharge electrodes 11 and 12 are provided as the exciting source. The voltage of the discharge electrodes 11 and 12 is controlled by a power supply circuit. When the laser gas 1 is excited by an electrical charge generated between the discharge electrodes 11 and 12, light is emitted. To narrow the spectral line width of the light, a wavelength dispersive element for dispersing the light for each wavelength, e.g., a grating 21, is provided on the rear side of the laser chamber 10. A partial transmission-type output coupler 31 for reflecting a portion of the incident light and transmitting a remaining portion thereof is provided on the front side of the laser chamber 10. An optical resonator 31 is formed by the grating 21 and the output coupler 31. A wavefront adjuster 32 is provided on an output side of the interior of the optical resonator, i.e., on the output coupler 31 side. The light is transmitted through the wavefront adjuster 32 from the laser chamber 10 side, and reaches the output coupler 31. The wavefront adjuster 32 is adjusted so that a desired spectral purity width E95 can be obtained. Then, when the light passes through the wavefront adjuster 32, the wavefront of the light is adjusted to a desired wavefront.

In accordance with a second aspect of the invention, the line narrowed laser apparatus according to the first aspect of the invention is characterized by further comprising a wavefront adjusting control unit for feedback controlling the wavefront adjuster to sample the light outputted from the partial transmission-type output coupler and obtain a desired spectral width.

Referring to FIG. 10, a description will be given of the second aspect of the invention. In the second aspect of the invention, the wavefront adjusting control unit, i.e., a laser controller 50 and a wavefront adjusting driver 52, feedback controls the wavefront adjuster 32. Namely, the light outputted from the output coupler 31 is subjected to sampling, and the spectral purity width E95 is detected. On the basis of the detected spectral purity width E95, the laser controller 50 controls the wavefront adjuster 32 through the wavefront adjusting driver 52 so as to obtain a desired spectral purity width E95.

In accordance with a third aspect of the invention, the line narrowed laser apparatus according to the first aspect of the invention is characterized in that the wavefront adjuster includes a cylindrical concave lens and a cylindrical convex lens which are respectively disposed on an optical path and a lens interval adjusting mechanism for adjusting an interval between the cylindrical concave lens and the cylindrical convex lens by moving at least one of the cylindrical concave lens and the cylindrical convex lens on the optical path.

Referring to FIG. 1, a description will be given of the third aspect of the invention. In the third aspect of the invention, the wavefront adjuster includes cylindrical concave lens concave and convex lenses 33 and 34 and a lens interval adjusting mechanism, i.e., a linear stage 35, for moving at least one of the cylindrical concave lens concave and convex lenses 33 and 34. When the distance between the principal points of the cylindrical concave and convex lenses 33 and 34 is adjusted, the wavefront of the light changes.

In accordance with a fourth aspect of the invention, the line narrowed laser apparatus according to the first to third aspects of the invention is characterized in that the laser medium is a laser gas, and the exciting source has a pair of mutually opposing discharge electrodes and a power supply circuit for applying a high voltage across the discharge electrodes, wherein the laser gas and the discharge electrodes are provided in an interior of a laser chamber.

The line narrowed laser apparatus according to the fourth aspect of the invention operates as described in the first aspect of the invention.

In accordance with a fifth aspect of the invention, the line narrowed laser apparatus according to the fourth aspect of the invention is characterized in that the discharge electrodes, the angle dispersion-type optical element, and the wavefront adjuster are disposed such that a wavefront dispersive plane of the wavelength dispersive element is perpendicular to a discharging direction between the discharge electrodes, and such that a straight line connecting apexes of cylindrical surfaces of the wavefront adjuster is parallel to the discharging direction between the discharge electrodes.

Referring to FIG. 1, a description will be given of the fifth aspect of the invention. In the fifth aspect of the invention, the discharge electrodes 11 and 12, the grating 21, and the concave and convex lenses 33 and 34 are disposed such that the wavelength dispersing plane of the grating 21 becomes perpendicular to the discharging direction between the discharge electrodes 11 and 12, and such that a straight line connecting apexes of the cylindrical concave and convex surfaces of the concave and convex lenses 33 and 34 becomes parallel to the discharging direction between the discharge electrodes 11 and 12.

According to the present invention, the following advantages can be obtained.

(1) In the state in which the pulse energy of the laser is being maintained, the dynamic range of the spectral purity width E95 can be made large. As a result, the spectral purity width E95 can be set in a wide range, so that stabilization can be attained with a desired spectral purity width E95.

Further, according to the third aspect of the invention, the following advantages can be obtained.

(2) Since the wavefront is varied independently of the central wavelength control by varying the distance between the concave and convex lenses, wavefront control with quick response becomes possible, and the response of control of the spectral purity width E95 correspondingly becomes quicker as compared to the wavelength shifting method and the grating bending method.

(3) Since the wavefront is varied by varying the distance between the concave and convex lenses, wavefront aberrations become small as compared to the grating bending method, so that it becomes possible to vary the spectral purity width with a fine waveform in which the spectral profile exhibits a substantially single peak. The reason is that it is difficult to bend the grating without a distortion.

(4) The spectral purity width E95 becomes actively controllable by merely installing a wavefront adjusting module on the front side of the conventional line narrowed laser (optional compatibility is facilitated).

DETAILED DESCRIPTION OF THE INVENTION

Hereafter, a description will be given of a line narrowed laser apparatus in accordance with the present invention with reference to the drawings.

First Embodiment

Figure 1A:
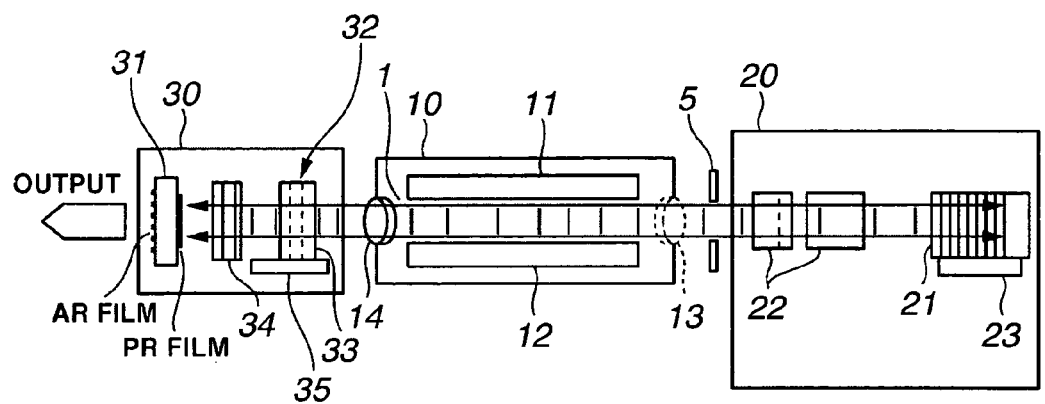
FIG. 1A is a top view of the configuration of a line narrowed laser apparatus in accordance with a first embodiment.
Figure 1B:
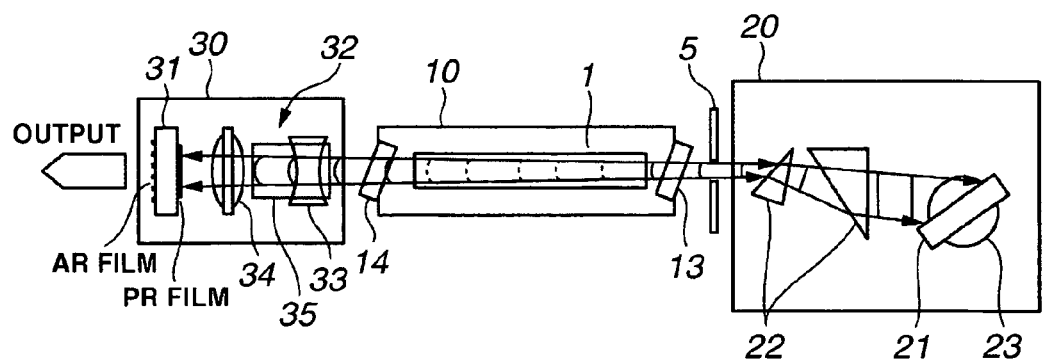
FIG. 1B is a side elevational view of the configuration of the line narrowed laser apparatus having a wavefront adjuster.

FIG. 1A is a top view of the configuration of a line narrowed laser apparatus in accordance with a first embodiment. FIG. 1B is a side elevational view of the configuration of the line narrowed laser apparatus having a wavefront adjuster.

As shown in FIGS. 1A and 1B, an ordinary line narrowing module 20 is disposed on the rear side (right side in the drawing) of a laser chamber 10, and a wavefront adjusting module 30 is disposed on the front side (left side in the drawing) thereof.

A pair of discharge electrodes 11 and 12, which are spaced apart a predetermined distance, whose longitudinal directions are parallel, and whose discharge surfaces are opposed to each other, are provided inside the laser chamber 10. Further, windows 13 and 14 are provided at a laser light outputting portion on the optical axis of the laser light in the laser chamber 10. The windows 13 and 14 are formed of a material which is permeable to the laser light, such as CaF2. The both windows 13 and 14 are disposed with their outer surfaces set parallel to each other, and are installed at an angle of polarization so as to lower the reflection loss of the laser light.

A laser gas 1 is sealed in the laser chamber 10 as a laser medium. In the case of an F2 laser, the laser gas 1 is a mixed gas consisting of F2 gas and a buffer gas constituted of such as He and Ne. In the case of a KrF excimer laser, the laser gas 1 is a mixed gas consisting of Kr gas, F2 gas, and a buffer gas constituted of such as He and Ne. In the case of an ArF excimer laser, the laser gas 1 is a mixed gas consisting of Ar gas, F2 gas, and a buffer gas constituted of such as He and Ne. The supply and discharge of the respective gases are controlled by unillustrated gas supplying and discharging mechanisms.

A high voltage is applied to the discharge electrodes 11 and 12 provided in the laser chamber 10 by an unillustrated power supply circuit. An electrical discharge takes place when the voltage across the discharge electrodes 11 and 12 exceeds a predetermined voltage. Then, the laser gas 1 is excited and shifts to a high energy level, and subsequently shifts to a low energy level. At this time, light is emitted.

The line narrowing module 20 is provided with optical elements such as two prism beam expanders 22 and a grating 21 which is a wavelength dispersive element. There are cases where the line narrowing module 20 is composed of optical elements such as an etalon, i.e., a wavelength dispersive element, and a total reflection mirror.

The wavefront adjusting module 30 has an output coupler 31 and a wavefront adjuster 32, for example. The output coupler 31 is an optical element which reflects a portion of the incident light and transmits the remaining portion of it. The wavefront adjuster 32 has a cylindrical concave lens (hereafter simply referred to as the "concave lens") 33, a cylindrical convex lens (hereafter simply referred to as the "convex lens") 34, and a linear stage 35 for holding the convex lens 33. The concave lens 33 and the convex lens 34 are disposed on an output-side optical axis within an optical resonator, and the concave lens 33 is movable along the optical axis in response to the operation of the linear stage 35. It should be noted that the convex lens 34 may be held on the linear stage 35. An anti-reflection film (AR film) for reducing the reflection loss is coated on the surfaces of the convex lens 34 and the concave lens 33. A partial reflection film (PR film) is coated on the optical resonator-side surface of the output coupler 31, and the AR film is coated on the output-side surface thereof.

The optical resonator is formed by the output coupler 31 in this wavefront adjusting module 30 and the grating 21 in the line narrowing module 20.

The wavefront adjusting module 30 has the function of adjusting the radius of curvature of the front-side wavefront in the optical resonator and the function of outputting a portion of the laser light and returning a remaining portion back into the optical resonator. The wavefront can be adjusted by moving, for example, the concave lens 33 along the optical axis. In a case where, for example, a wavefront having no radius of curvature (flat) is converted into a flat wavefront, the focal positions of the convex lens 34 and the concave lens 33 coincide. The distance between the convex lens 34 and the concave lens 33 at this time is set as $D_0$. In a case where a flat wavefront is converted into a convex wavefront, the position of the concave lens 33 is adjusted so as to make the distance between the convex lens 34 and the concave lens 33 greater than $D_0$. On the other hand, in a case where a flat wavefront is converted into a convex wavefront, the position of the concave lens 33 is adjusted so as to make the distance between the convex lens 34 and the concave lens 33 smaller than $D_0$. The wavefront of the light in the optical resonator can be adjusted by varying the distance between the convex lens 34 and the concave lens 33 in this manner.

Here, a description will be given of the relative positional relationship between the wavefront adjusting module 30 and the line narrowing module 20 with respect to the discharge electrodes 11 and 12 in the laser chamber 10.

Generally, the line narrowing by using wavelength dispersive elements (the grating and the dispersive prism) is effected efficiently by narrowing the beam divergence angle of the laser light incident upon the wavelength dispersive elements. Accordingly, the reference document (JP-A-2-203178) discloses a technique wherein since the beam divergence angle of the laser in a perpendicular direction (in the vertical direction in the drawings) to the discharging direction of the laser is narrow (the beam width is narrow), the optical elements and the laser chamber (in the discharging direction) are disposed such that the planes (wavelength dispersion planes) including the respective wavelength dispersive directions of the wavelength dispersive elements and the plane in the discharging direction of the electrodes become substantially perpendicular, thereby making it possible to narrow the spectrum of the laser light and obtain a high output. In this embodiment, by optimizing the direction of the wavefront of the wavefront adjusting module 30 in addition to the optical elements in the line narrowing module 20 and the laser chamber 10, it is possible to realize a high output and a variable range with a wide E95.

Inside the laser chamber 10, a high voltage is applied between the discharge electrodes 11 and 12 by an unillustrated high-voltage power supply circuit to effect the electrical discharge. A gain region of the laser is formed in a discharge area between the discharge electrodes 11 and 12. When the discharge is effected between the discharge electrodes 11 and 12, the light is transmitted through the rear-side window 13 and a slit 5, and the beam is expanded in a substantially perpendicular direction to the discharging direction by the prism beam expanders 22. This expanded beam of light is incident upon the diffraction plane of the grating 21 at a predetermined angle α, and the light in a predetermined wavelength range is diffracted at the same diffraction angle α. This angular disposition of the grating 21 is referred to as the Littrow configuration. Namely, the grating 21 is disposed such that its own wavelength dispersive plane is substantially perpendicular to the discharging direction between the discharge electrodes 11 and 12. The light which is diffracted by the grating 21 is transmitted again through the prism beam expanders 22. The slit 5 allows only the light of the selected wavelength to be transmitted therethrough, and the light of the selected wavelength passes through the rear-side window 13, and is incident upon the discharge area. The light of the selected light is amplified by being transmitted through the discharge area. The amplified light passes through the front-side window 14, is incident upon the wavefront adjusting module 30, and is transmitted through the cylindrical concave and convex lenses 33 and 34, thereby allowing the wavefront to be adjusted. The concave and convex lenses 33 and 34 are disposed such that a straight line connecting apexes of the cylindrical concave and convex surfaces of the concave and convex lenses 33 and 34 becomes parallel to the discharging direction between the discharge electrodes 11 and 12, and becomes substantially perpendicular to the wavelength dispersive plane of the grating 21. Then, a portion of the laser light is fetched as output light by the output coupler 31, while a remaining portion of it is reflected and is transmitted again through the concave and convex lenses 33 and 34, thereby adjusting the wavefront. This light is transmitted again through the discharge area through the front-side window 14 and is amplified. The laser is oscillated by the optical resonator having the above-described configuration, and laser light of a predetermined E95 spectral width is outputted. The wavelength selection characteristics of the wavelength dispersive elements (the grating and the dispersive prism) can be varied by the variation of the wavefront at the wavelength dispersive plane. Accordingly, as described above, the concave and convex lenses 33 and 34 and the grating 21 are respectively disposed such that the cylindrical surfaces of the concave and convex lenses 33 and 34 and the wavelength dispersive plane of the grating 21 become substantially perpendicular. Although in this embodiment the wavefront adjusting module 30 having the cylindrical concave and convex lenses 33 and 34 has been shown, the present invention is not limited to the same, and it suffices if the wavefront which is adjusted by the wavefront adjusting module 30 is so configured as to become substantially perpendicular to the wavelength dispersion plane. In other words, it suffices in the case where the plane wave has been transmitted through the wavefront adjusting module 30, the wavefront is converted into a cylindrical profile, and the cylindrical plane of this wavefront becomes substantially perpendicular to the wavelength dispersive plane.

Next, a comparison will be made between the characteristics of this embodiment, i.e., the characteristics in a case where the wavefront adjustment is made by the wavefront adjusting module 30 disposed on the front side of the laser chamber 10, and the conventional characteristics, i.e., the characteristics in a case where the wavefront adjustment is made by the grating disposed on the rear side of the laser chamber.

Figure 2:
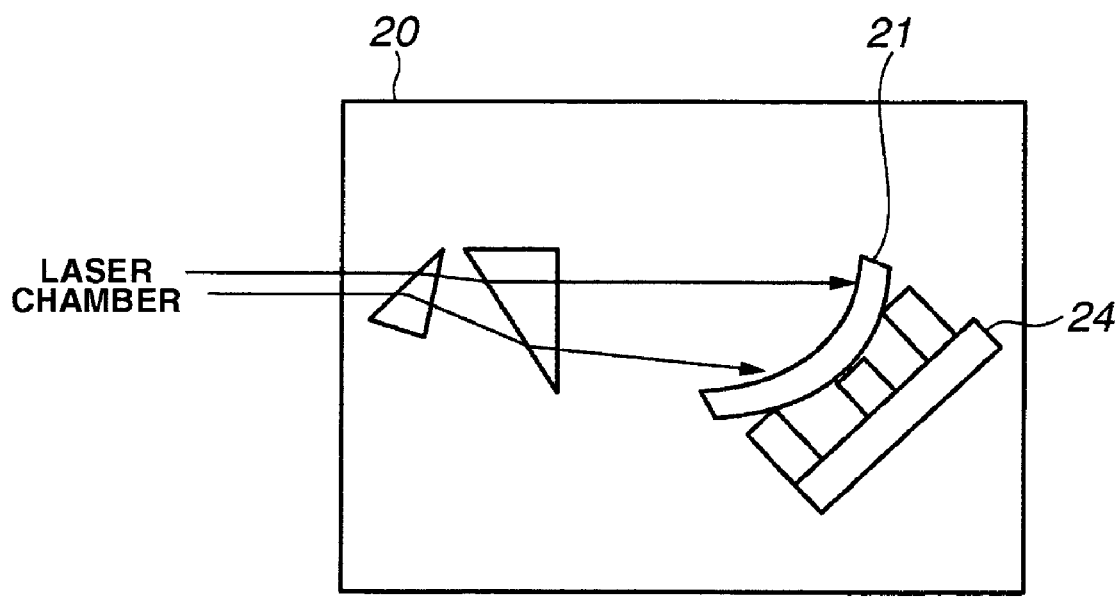
FIG. 2 is a diagram illustrating a grating bending mechanism.
Figure 3A:
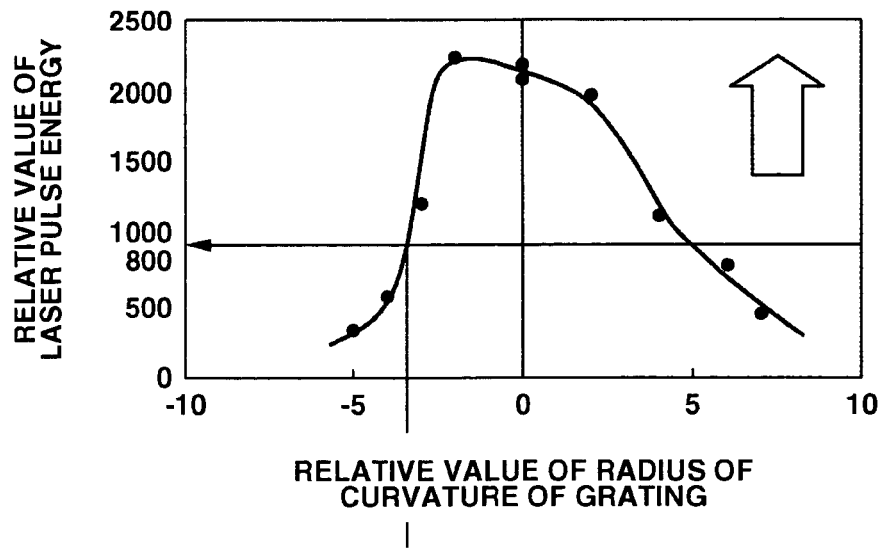
FIGS. 3A and 3B are diagrams illustrating the characteristics in a case where wavefront adjustment is made by a grating.
Figure 3B:
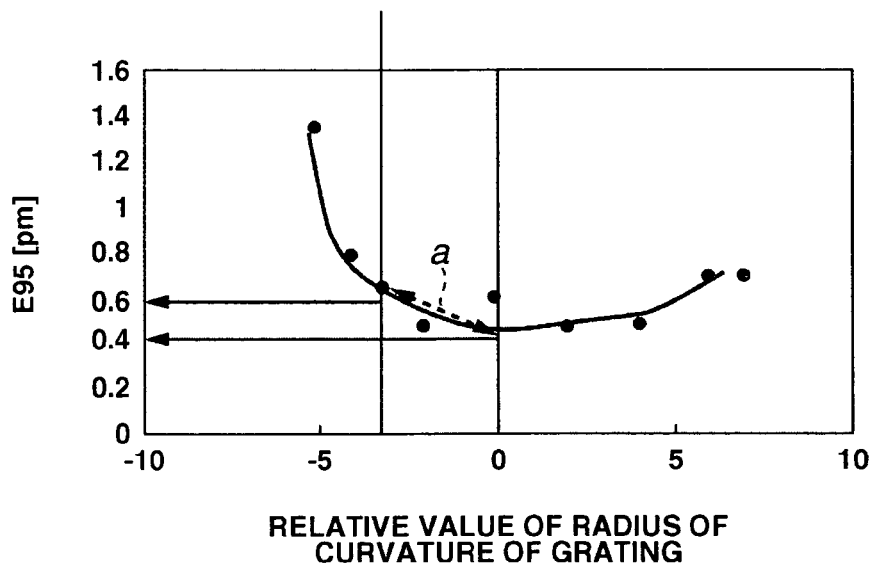

FIG. 2 shows a grating bending mechanism. FIGS. 3A and 3B show the characteristics in the case where the wavefront adjustment is made by the grating. FIG. 3A shows the relative value dependency between the relative value of the pulse energy of the laser and the radius of curvature of the grating, and FIG. 3B shows the relative value dependency between the spectral purity width E95 and the radius of curvature of the grating.

A grating bending mechanism 24 shown in FIG. 2 is so arranged that in a state in which both ends of the grating 21 are gripped, the center of the grating 21 is pushed and pulled so as to adjust the radius of curvature of the grating 21.

The present inventors determined the pulse energy of the laser light which is outputted and the spectral purity width E95 by varying the radius of curvature of the grating 21 by using the grating bending mechanism 24 shown in FIG. 2, to thereby determine the relationships between, on the one hand, the radius of curvature of the grating 21 and, on the other hand, the pulse energy of the laser light and the spectral purity width E95.

As shown in FIG. 3A, the relationship between the relative value of the pulse energy of the laser and the relative value of the radius of curvature of the grating 21 became an upwardly convex curve. If it is assumed that the relative value of the necessary pulse energy is 800 or more, the relative value of the radius of curvature of the grating 21 in this case is in the range of −3 to +4.

As shown in FIG. 3B, the relationship between the spectral purity (E95) and the relative value of the radius of curvature of the grating 21 became a downwardly convex curve. In the range of −3 to +4 in terms of the relative value of the radius of curvature of the grating 21, the range of fluctuation of the spectral purity (E95) was between approx. 0.4 pm and approx. 0.6 pm. To control the spectral purity width E95, it is necessary to control the radius of curvature of the grating 21 in the region of a monotonously decreasing curve or a monotonously increasing curve. Accordingly, as shown by the broken line a in FIG. 3B, the spectral purity width E95 can be decreased from approx. 0.6 pm to approx. 0.4 pm by varying the relative value of the radius of curvature of the grating 21 from −3 to 0.

From the above, it became clear that, in the line narrowed laser in which the spectral width is controlled by the bending of the grating, in the state in which the pulse energy of the laser is being maintained, the width of variation of the spectral purity width E95 cannot be made very large, so that the dynamic range cannot be made very large.

Figure 4A:
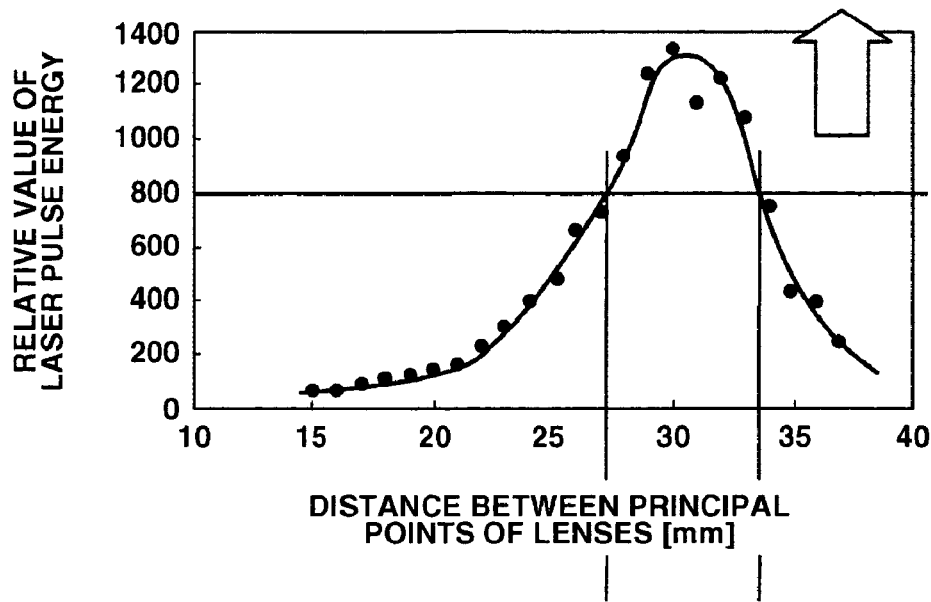
FIGS. 4A and 4B are diagrams illustrating the characteristics in a case where the wavefront adjustment is made by cylindrical concave and convex lenses.
Figure 4B:
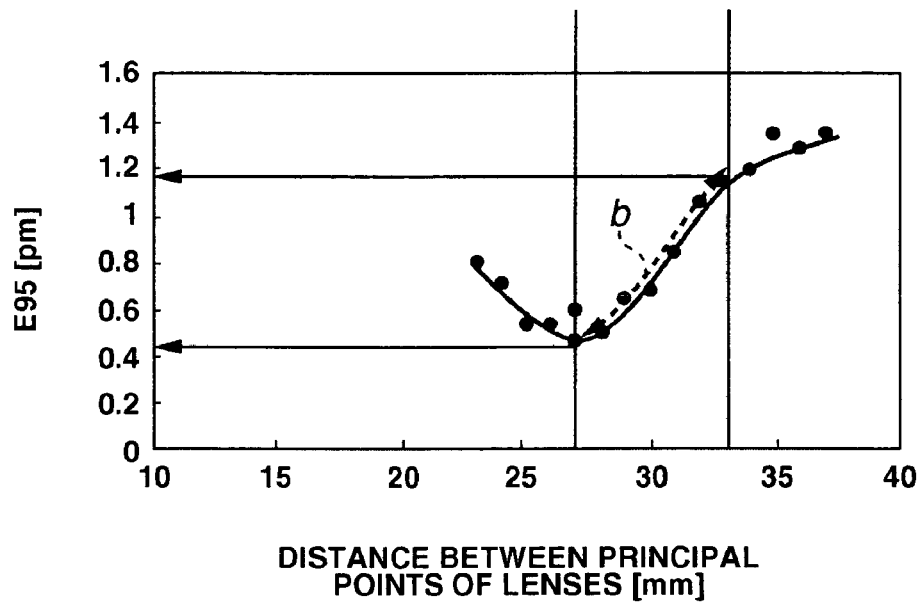

FIGS. 4A and 4B show the characteristics in the case where the wavefront adjustment is made by the cylindrical concave and convex lenses. FIG. 4A shows the relative dependency between the relative value of the pulse energy of the laser and the radius of curvature of the grating, and FIG. 4B shows the relative dependency between the spectral purity width E95 and the radius of curvature of the grating.

The present inventors determined the pulse energy of the laser light which is outputted and the spectral purity width E95 by varying the distance between the principal points of the concave and convex lenses 33 and 34 by the linear stage 35 shown in FIGS. 1A and 1B, to thereby determine the relationships between, on the one hand, the distance between the principal points of the concave and convex lenses 33 and 34 and, on the other hand, the pulse energy of the laser light and the spectral purity width E95.

As shown in FIG. 4A, the relationship between the relative value of the pulse energy of the laser and the distance between the principal points of the lenses became an upwardly convex curve. If it is assumed that the relative value of the necessary pulse energy is 800 or more, the distance between the concave and convex lenses 33 and 34 in this case is in the range of 27 mm to 34 mm.

As shown in FIG. 4B, the relationship between the spectral purity (E95) and the distance between the principal points of the concave and convex lenses 33 and 34 became a downwardly convex curve. In the range of 27 mm to 34 mm in terms of the distance between the principal points of the concave and convex lenses 33 and 34, the range of fluctuation of the spectral purity (E95) was between approx. 0.4 pm and approx. 1.2 pm. To control the spectral purity width E95, it is necessary to control the distance between the principal points of the concave and convex lenses 33 and 34 in the region of a monotonously decreasing curve or a monotonously increasing curve. Accordingly, as shown by the broken line b in FIG. 4B, the spectral purity width E95 can be increased from approx. 0.4 pm to approx. 1.2 pm by varying the distance between the principal points of the concave and convex lenses 33 and 34 from 27 mm to 34 mm.

From the above, it became clear that, in the line narrowed laser in which the spectral width is controlled by adjusting the distance between the principal points of the concave and convex lenses 33 and 34, even in the state in which the pulse energy of the laser is being maintained, the width of variation of the spectral purity width E95 can be made large as compared with the case shown in FIG. 3, and that the dynamic range can be made very large.

Concerning the cause of the fact that the dynamic range of E95 becomes large if the wavefront adjustment is performed on the front side of the laser chamber, the present inventors conjecture that the discharge area of the laser can be utilized more effectively by performing the wavefront adjustment on the front side of the laser chamber rather than on the rear side thereof. The details will be explained below.

Figure 5A:
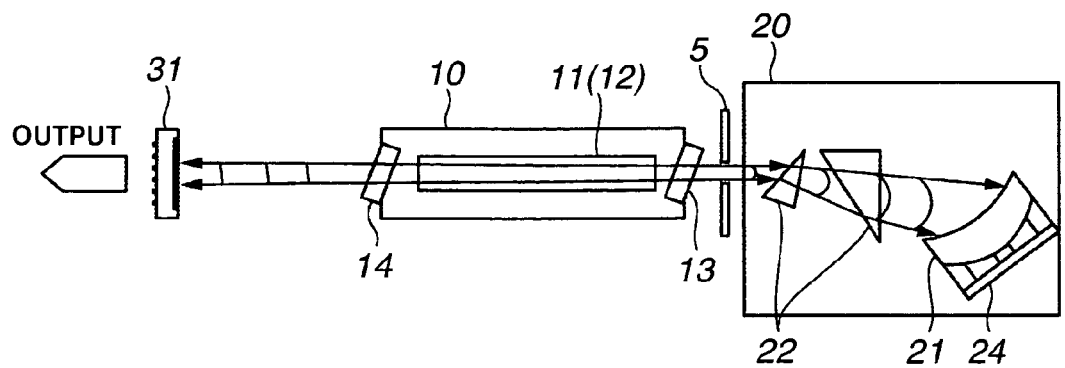
FIG. 5A is a side elevational view of the configuration of the line narrowed laser apparatus in which the wavefront adjustment is made by the grating provided on the rear side.
Figure 5B:
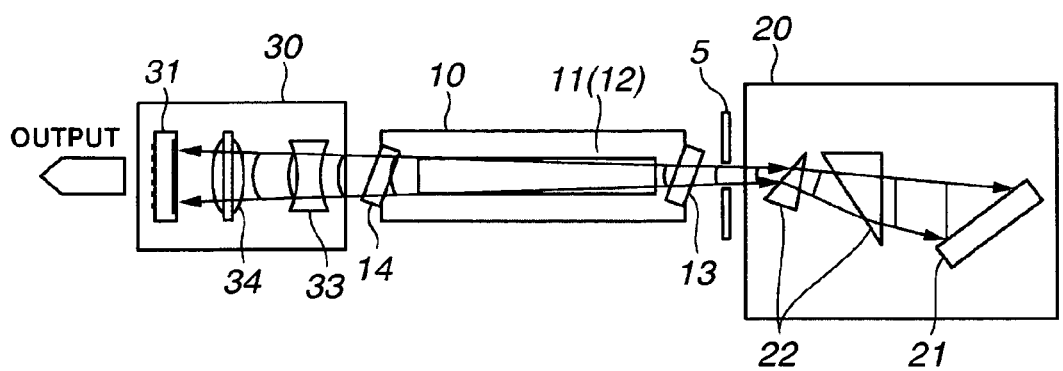
FIG. 5B is a side elevational view of the configuration of the line narrowed laser apparatus in which the wavefront adjustment is made by the concave and convex lenses provided on the front side.

FIG. 5A is a side elevational view of the configuration of the line narrowed laser apparatus in which the wavefront adjustment is made by the grating provided on the rear side, while FIG. 5B is a side elevational view of the configuration of the line narrowed laser apparatus in which the wavefront adjustment is made by the concave and convex lenses provided on the front side.

First, a description will be given of the case where the wavefront adjustment is made on the rear side of the laser chamber 10. Here, it is assumed that, as shown in FIG. 5A, the grating bending mechanism 24 is disposed in the line narrowing module 20 on the rear side of the laser chamber 10, and that the wavefront adjustment is performed by the grating bending mechanism 24 and the grating 21. The light emitted by the electrical discharge generated in the discharge area is transmitted through the rear-side window 13 and the slit 5, and the beam is expanded in a substantially perpendicular direction to the discharging direction by the prism beam expanders 22. The expanded beam of light is incident upon the grating 21 at a predetermined angle and is diffracted. Here, the wavelength dispersion plane of the grating 21 and the discharging direction of the discharge electrodes 11 and 12 are substantially perpendicular. The light diffracted by the grating 21 is transmitted again through the prism beam expanders 22. The slit 5 transmits only the light of the selected wavelength, and the light of that selected wavelength is transmitted through the window 13 and is incident upon the discharge area between the discharge electrodes 11 and 12. It should be noted that since the width of the light transmitted through the slit 5 is substantially narrower than the width of the discharge area (the width between the discharge electrodes 11 and 12), the light of the selected wavelength is not amplified efficiently. The light amplified in the discharge area is transmitted through the front-side window 14, and a portion of it is fetched as the output light of the laser by the output coupler 31, and a remaining portion of it is reflected thereby. The reflected light is transmitted again through the window 14 and is incident upon the discharge area so as to be amplified. As the optical resonator is configured so as to be able to perform the above-described operation, the laser is oscillated, and the laser light having a predetermined spectral width of E95 is outputted. Thus, in the case where the wavefront adjustment is made on the rear side of the laser chamber 10, the light of the selected wavelength is not filled efficiently in the discharge area, so that the variable range of E95 cannot be broadened in the state in which the laser output is being maintained.

Next, a description will be given of the case where the wavefront adjustment is made on the front side of the laser chamber 10. Here, it is assumed that, as shown in FIG. 5B, the concave and convex lenses 33 and 34 are disposed in the wavefront adjusting module 30 on the front side of the laser chamber 10, and that the wavefront adjustment is performed by the concave and convex lenses 33 and 34. The light emitted by the electrical discharge generated in the discharge area is transmitted through the rear-side window 13 and the slit 5, and the beam is expanded in a substantially perpendicular direction to the discharging direction by the prism beam expanders 22. The expanded beam of light is incident upon the grating 21 at a predetermined angle and is diffracted. Here, the wavelength dispersion plane of the grating 21 and the discharging direction of the discharge electrodes 11 and 12 are substantially perpendicular. The light diffracted by the grating 21 is transmitted again through the prism beam expanders 22. The slit 5 transmits only the light of the selected wavelength, and the light of that selected wavelength is transmitted through the window 13 and is incident upon the discharge area between the discharge electrodes 11 and 12. The light of the selected wavelength is amplified by being transmitted through the discharge area. Here, although the width of the light transmitted through the slit 5 is narrower than the width of the discharge area (the width between the discharge electrodes 11 and 12), the light of the selected wavelength is transmitted through the discharge area in the form of a spherical wave having a predetermined expanse, so that the light of the selected wavelength is amplified efficiently. The light amplified in the discharge area is transmitted through the front-side window 14, and is transmitted through the concave and convex lenses 33 and 34 so as to be converted into a predetermined wavefront. Then, as for the amplified light, a portion of it is fetched as the output light of the laser by the output coupler 31, and a remaining portion of it is reflected thereby. The reflected light is transmitted again through the window 14 and is incident upon the discharge area so as to be amplified. As the optical resonator is configured so as to be able to perform the above-described operation, the laser is oscillated, and the laser light having a predetermined spectral width of E95 is outputted. Thus, in the case where the wavefront adjustment is made on the front side of the laser chamber 10, the light of the selected wavelength is filled efficiently in the discharge area, so that the variable range of E95 can be broadened in the state in which the laser output is being maintained.

It is possible to cite the following advantages (1) to (4) as the advantages of this embodiment.

(1) In the state in which the pulse energy of the laser is being maintained, the dynamic range of the spectral purity width E95 can be made large. As a result, the spectral purity width E95 can be set in a wide range, so that stabilization can be attained with a desired spectral purity width E95.

(2) Since the wavefront is varied by varying the distance between the concave and convex lenses, wavefront control with quick response becomes possible, and the response of control of the spectral purity width E95 correspondingly becomes quicker as compared to the grating bending method.

(3) Since the wavefront is varied by varying the distance between the concave and convex lenses, wavefront aberrations become small as compared to the grating bending method, so that it becomes possible to vary the spectral purity width with a fine waveform in which the spectral profile exhibits a substantially single peak. The reason is that it is difficult to bend the grating without a distortion.

(4) The spectral purity width E95 becomes actively controllable by merely installing a wavefront adjusting module on the front side of the conventional line narrowed laser (optional compatibility is facilitated).

It should be noted that, as the optical elements for wavefront adjustment, those in which the cylindrical wavefront is adjusted are most preferable; however, if those in which the spherical wavefront is adjusted are used, it is possible to attain substantially similar functions. Accordingly, spherical concave and convex lenses may be combined as the optical elements for wavefront adjustment.

Second Embodiment

In this embodiment, a description will be given of a form different from the first embodiment.

Figure 6:
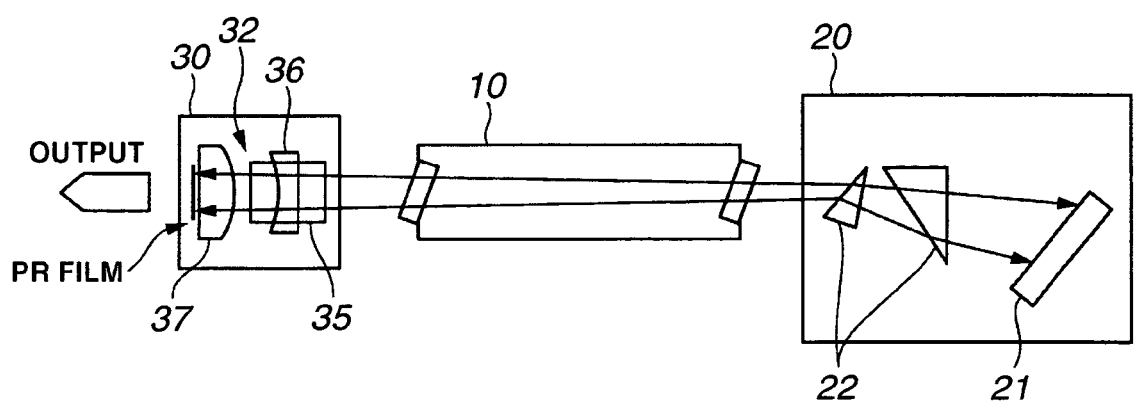
FIG. 6 is a side elevational view of the configuration of the line narrowed laser apparatus in accordance with a second embodiment.

FIG. 6 is a side elevational view of the configuration of the line narrowed laser apparatus in accordance with a second embodiment. The difference between the first embodiment and the second embodiment lies in the internal configuration of the wavefront adjusting module.

As shown in FIG. 6, the wavefront adjusting module 30 has the wavefront adjuster 32. The wavefront adjuster 32 has a cylindrical convex lens 37, a cylindrical concave lens 36, and the linear stage 35 for holding the concave lens 36. The convex lens 37 has one surface processed into a flat shape and the other surface processed into a cylindrical shape. Meanwhile, the concave lens 36 has one surface processed into a flat shape and the other surface processed into a cylindrical shape. The convex lens 37 and the concave lens 36 are arranged on the optical axis such that the cylindrical convex surface of the convex lens 37 and the cylindrical concave surface of the concave lens 36 are opposed to each other, and such that the flat surface of the convex lens 37 faces the laser output side, while the flat surface of the concave lens 36 faces the laser chamber 10 side. A PR film is coated on the flat surface of the convex lens 37, and an AR film is coated on the cylindrical convex surface of the convex lens 37 and on the cylindrical concave surface and the flat surface of the concave lens 36. The convex lens 37 of this embodiment also has the function of an output coupler.

In this embodiment, the convex lens 37 having the function of the output coupler is fixed on the optical axis, and the concave lens 36 with the AR film coated on both surfaces thereof is driven along the optical axis, to thereby perform the wavefront adjustment.

It is possible to cite the following advantages (1) to (3) as the advantages of the second embodiment.

(1) Since the number of optical elements can be reduced, cost reduction is possible.

(2) Since the number of planes in the resonator is reduced as compared with the first embodiment, the efficiency of the laser improves.

(3) Since the cylindrical convex lens having the function of the output coupler is fixed, the optical axis of the laser light is difficult to fluctuate.

In this embodiment, as for the wavefront adjuster 32, the PR film is coated on the flat surface of the convex lens 37, and the AR film is coated on the cylindrical convex surface thereof, but the present invention is not limited to the same. It is possible to provide both the functions of the wavefront adjustment and the output coupler even if the PR film is coated on the cylindrical convex surface of the convex lens 37, and the AR film is coated on the flat surface thereof.

In the same way as in the first embodiment, as the optical elements for wavefront adjustment, those in which the cylindrical wavefront is adjusted are most preferable; however, if those in which the spherical wavefront is adjusted are used, it is possible to attain substantially similar functions. Accordingly, spherical concave and convex lenses may be combined as the optical elements for wavefront adjustment.

FIGS. 25A to 25D show patterns other than the combinations of concave and convex lenses shown in the first and second embodiments.

Figure 25A:
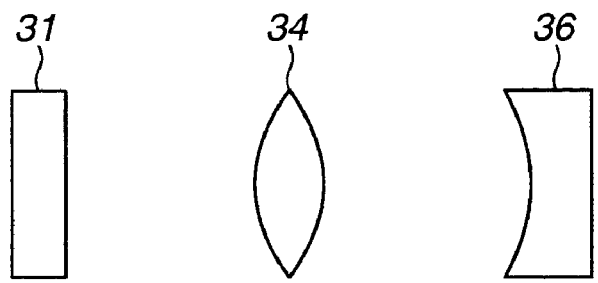
FIGS. 25A to 25D are diagrams illustrating patterns of combination of concave and convex lenses.
Figure 25B:
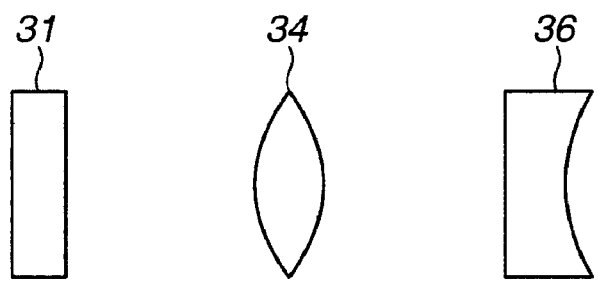

As shown in FIG. 25A, the wavefront adjuster may be formed by the concave lens 36 having a cylindrical surface on one surface and a flat surface on the other surface, the convex lens 34 having cylindrical surfaces on both surfaces, and the output coupler 31, and the cylindrical surface of the concave lens 36 and the cylindrical surface of the convex lens 34 may be opposed to each other. In addition, as shown in FIG. 25B, the flat surface of the concave lens 36 and the cylindrical surface of the convex lens 34 may be opposed to each other.

Figure 25C:
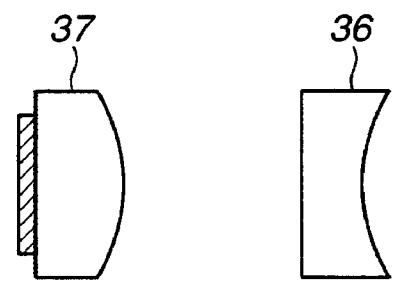

Further, as shown in FIG. 25C, the wavefront adjuster may be formed by the concave lens 36 having the cylindrical surface on one surface and the flat surface on the other surface and the convex lens 37 having a cylindrical surface on one surface and a flat surface on the other surface and having the PR film coated on the flat surface, and the flat surface of the concave lens 36 and the cylindrical surface of the convex lens 37 may be opposed to each other.

Figure 25D:
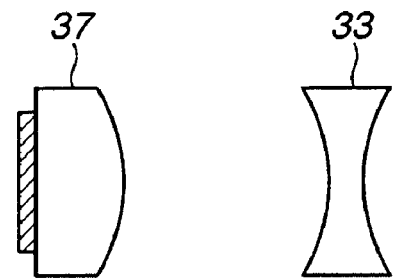
Figure 26:
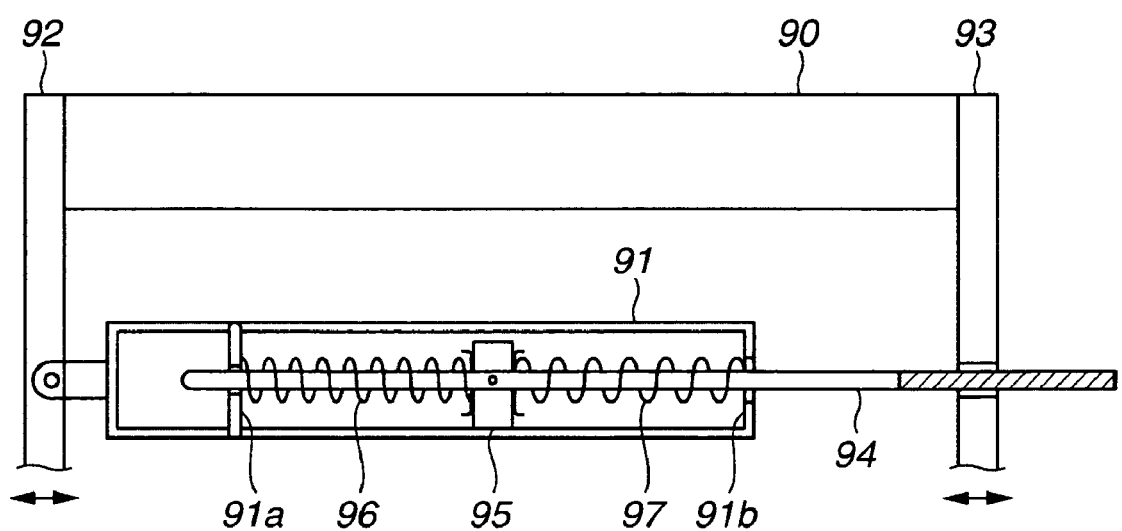
FIG. 26 is a diagram illustrating the grating bending mechanism for controlling the spectral purity width

Furthermore, as shown in FIG. 25D, the wavefront adjuster may be formed by the concave lens 33 having cylindrical surfaces on both surfaces and the convex lens 37 having the cylindrical surface on one surface and the flat surface on the other surface and having the PR film coated on the flat surface, and the flat surface of the concave lens 33 and the cylindrical surface of the convex lens 37 may be opposed to each other.

Third Embodiment

In this embodiment, a description will be given of still another form different from the first embodiment.

Figure 7:
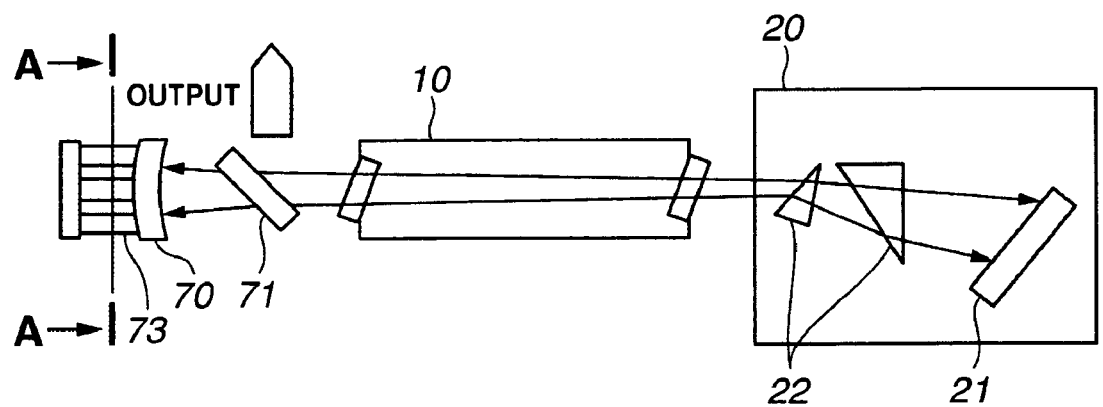
FIG. 7 is a side elevational view of the configuration of the line narrowed laser apparatus in accordance with a third embodiment.
Figure 8:
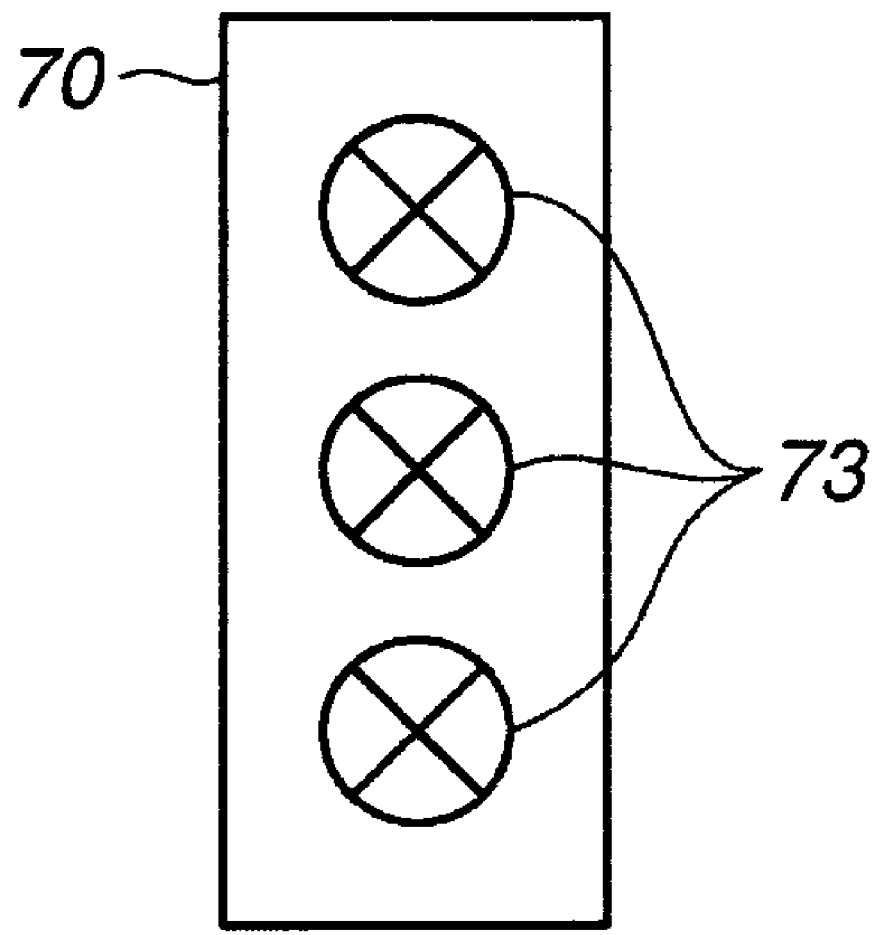
FIG. 8 is a diagram illustrating a cross section taken along line A-A in FIG. 7.

FIG. 7 is a side elevational view of the configuration of the line narrowed laser apparatus in accordance with a third embodiment. FIG. 8 shows a cross section taken along line A-A in FIG. 7. The difference between the first embodiment and the third embodiment lies in the configuration of the front side of the laser.

As shown in FIG. 7, a deformable mirror 70, which is an end mirror, is disposed on the front side of the laser chamber 10. In this embodiment, the laser wavefront is varied (modified) by shaping the configuration of the total reflection surface of the deformable mirror 70.

The laser resonator is formed by the grating 21 Littrow-configured on the rear side of the laser chamber 10 and the deformable mirror 70 disposed on the front side. A 45-degree incident beam splitter 71 is disposed on the optical path between the laser chamber 10 and the front-side deformable mirror 70. The beam splitter 71 functions as the output coupler. Namely, a portion of the light outputted from the laser chamber 10 is reflected by the beam splitter 71, and is outputted as the laser light.

On the other hand, the light transmitted through the beam slitter 71 has its reflected wavefront varied by the deformable mirror 70, and is incident again upon the beam slitter 71. The light transmitted through the beam slitter 71 is transmitted through the laser chamber 10 and is amplified. Then, the light transmitted through the laser chamber 10 amplified has its line narrowed by the prism beam expanders 22 and the grating 21. The diffracted light is transmitted again through the laser chamber 10, and is amplified. Then, the light transmitted through the laser chamber 10 and amplified is made incident again upon the beam slitter 71 to generate laser oscillation. The wavefront of the laser light generated in the laser chamber 10 ideally assumes a cylindrical wavefront.

As for the deformable mirror 70, a plurality of portions of its reflecting surface are mechanically pushed and pulled by actuators 73. FIGS. 7 and 8 show the deformable mirror 70 of a line type and the actuators 73 provided at three points on the reflecting surface of the deformable mirror 70. Piezoelectric elements, for example, are used as the actuators 73. As the respective actuators 73 (piezoelectric elements) are extended and contracted, the reverse surface of the deformable mirror 70 is pushed and pulled. As a result, the respective portions of the reflecting surface of the deformable mirror 70 are pushed and pulled, thereby adjusting the magnitude of the radius of curvature of the deformable mirror 70. It should be noted that although FIGS. 7 and 8 illustrate by way of example the case where the number of the actuators 73 is three, the present invention is not limited to the same, and the number of the actuators 73 is arbitrary. Wavefront adjustment with higher accuracy becomes possible by increasing the number of the actuators 73. In addition, the actuators 73 for pushing and pulling the reflecting surface of the deformable mirror 70 are not limited to the piezoelectric elements, and arbitrary actuators may be used. For example, in addition to the piezoelectric elements, it is possible to use actuators for pushing and pulling the reflecting surface of the deformable mirror 70 by making use of thermal expansion based on the temperature change.

Advantages peculiar to this embodiment are shown below. The deformable mirror is able to convert the wavefront into a wavefront of an arbitrary profile by disposing a multiplicity of actuators. For example, it becomes possible to correct a complex wavefront of the light occurring due to acoustic waves caused by the discharge in the laser chamber occurring at the time of a high rate of repetition. In addition, it becomes possible to adjust the distortion of a complex wavefront of the light occurring due to the heat in the line narrowing module.

Fourth Embodiment

Figure 9:
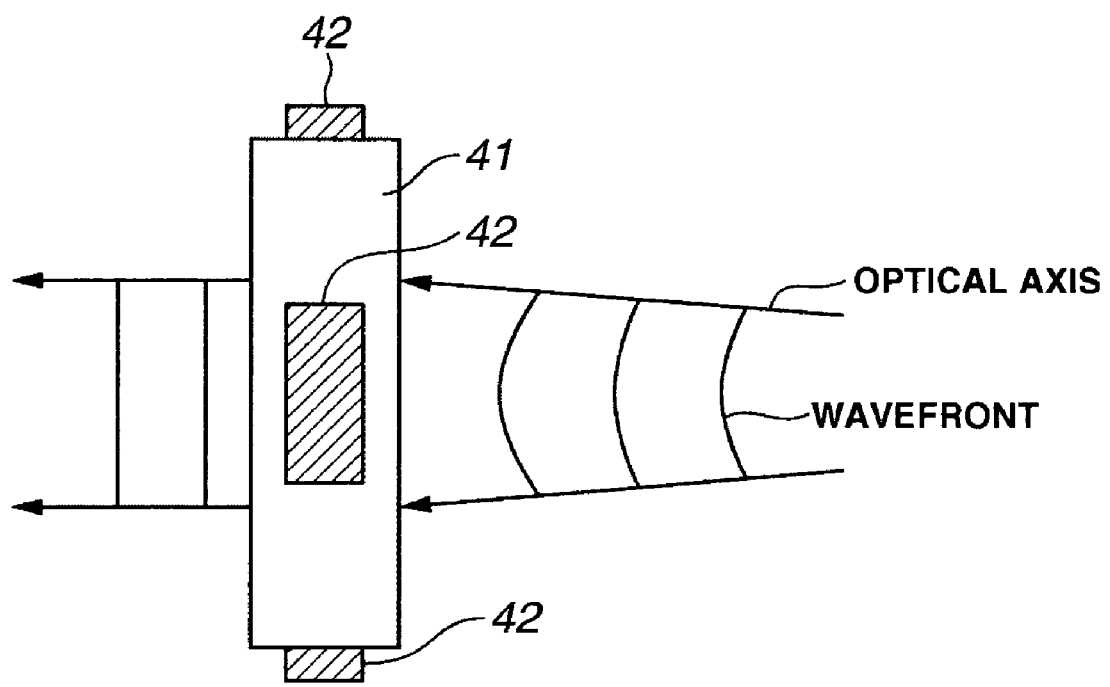
FIG. 9 is a diagram illustrating the wavefront adjuster in accordance with a fourth embodiment.

FIG. 9 shows the wavefront adjuster in accordance with a fourth embodiment.

Generally, the refractive index of an optical material such as CaF2 changes according to the temperature. Therefore, it is possible to generate a refractive index distribution by intentionally imparting a temperature distribution to the optical element. Hence, as shown in FIG. 9, heating/cooling devices 42 capable of heating and cooling such as thermo-elements are respectively installed on the four side surfaces of a CaF2 substrate 41 which is an optical material. The temperatures of the CaF2 substrate 41 in the vicinities where the heating/cooling devices 42 are installed are detected by temperature sensors 42*a*. The respective heating/cooling devices 42 are subjected to temperature control on the basis of the detected values of the temperature sensors 42*a* so that the CaF2 substrate 41 exhibits a predetermined temperature distribution to impart a desired refractive index distribution to the CaF2 substrate 41, thereby varying the wavefront of the laser light.

This wavefront adjuster can function as the wavefront adjusting module by being installed between the laser chamber and the output coupler. The AR film is coated on both surfaces of the CaF2 substrate 41. In addition, in order to function jointly as the output coupler, the PR film may be coated on the output-side surface of the CaF2 substrate 41, and the AR film may be coated on the optical resonator-side surface thereof. In this case, the functions of the invention can be realized by one element, and the efficiency of the laser improves.

Fifth Embodiment

In this embodiment, a description will be given of the laser system having the laser apparatus described in the first embodiment, as well as control thereof. It should be noted that it is also possible to apply the laser apparatuses of the second to fourth embodiments to the laser system of this embodiment.

Figure 10:
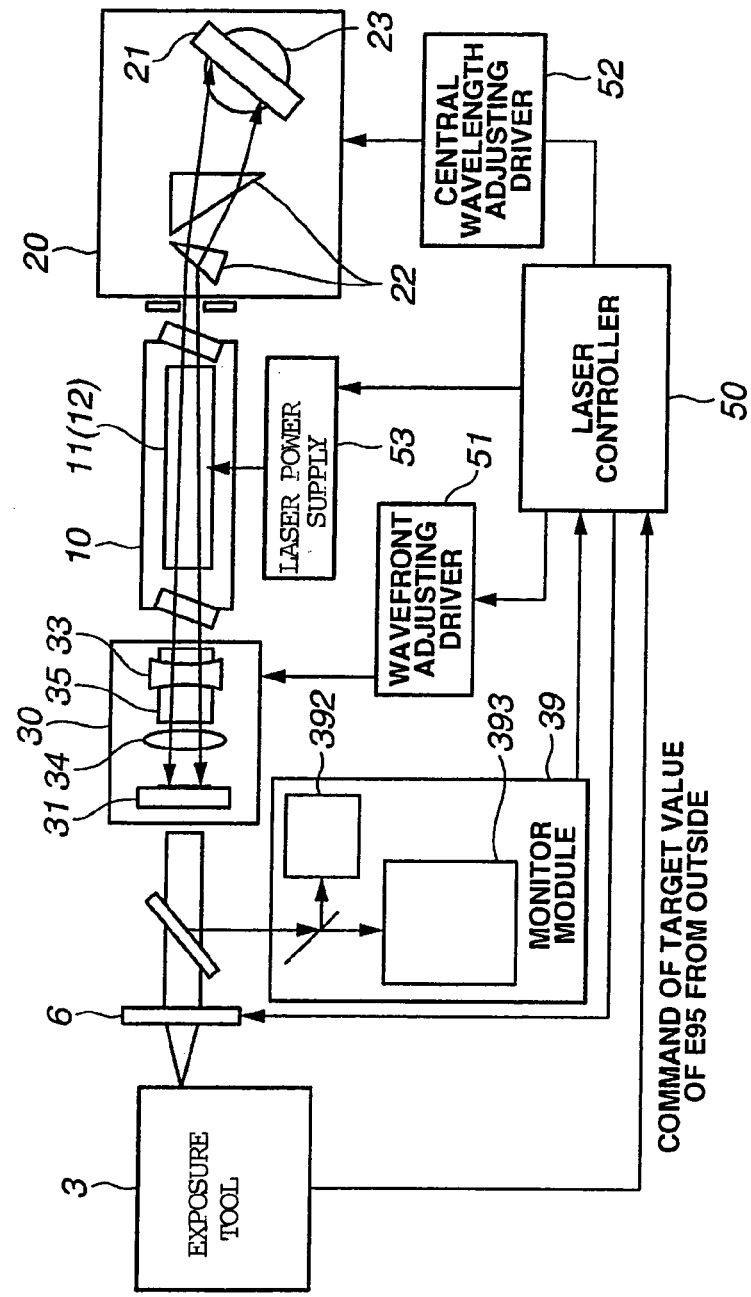
FIG. 10 is a diagram illustrating the configuration of a control system for controlling the spectral purity width E95 in accordance with a fifth embodiment.

FIG. 10 shows the configuration of a control system for controlling the spectral purity width E95 in accordance with a fifth embodiment.

The laser system in accordance with this embodiment is comprised of the wavefront adjusting module 30 disposed on the front side of the laser chamber 10 to adjust the wavefront inside the optical resonator; the line narrowing module 20 disposed on the rear side of the laser chamber 10 to narrow the spectral line width; a monitor module 39 for detecting the light outputted from the output coupler; a shutter 6 for changing over between the shutting off and the output of the output laser light; a laser controller 50 for supervising and controlling the overall laser system; a central wavelength adjusting driver 51 for converting a wavelength control signal outputted from the laser controller 50 into an operation signal of an actuator (e.g. a rotating stage 23) provided in the line narrowing module 20 and for outputting the same; a wavefront adjusting driver 52 for converting a wavefront control signal outputted from the laser controller 50 into an operation signal of an actuator (e.g., the linear stage 35) provided in the wavefront adjusting module 30 and for outputting the same; and a laser power supply 53 for controlling the pulse energy of the laser. In this embodiment, the laser light outputted from the laser apparatus is guided by an exposure tool 3, and is used for the exposure of a semiconductor wafer.

Figure 11:
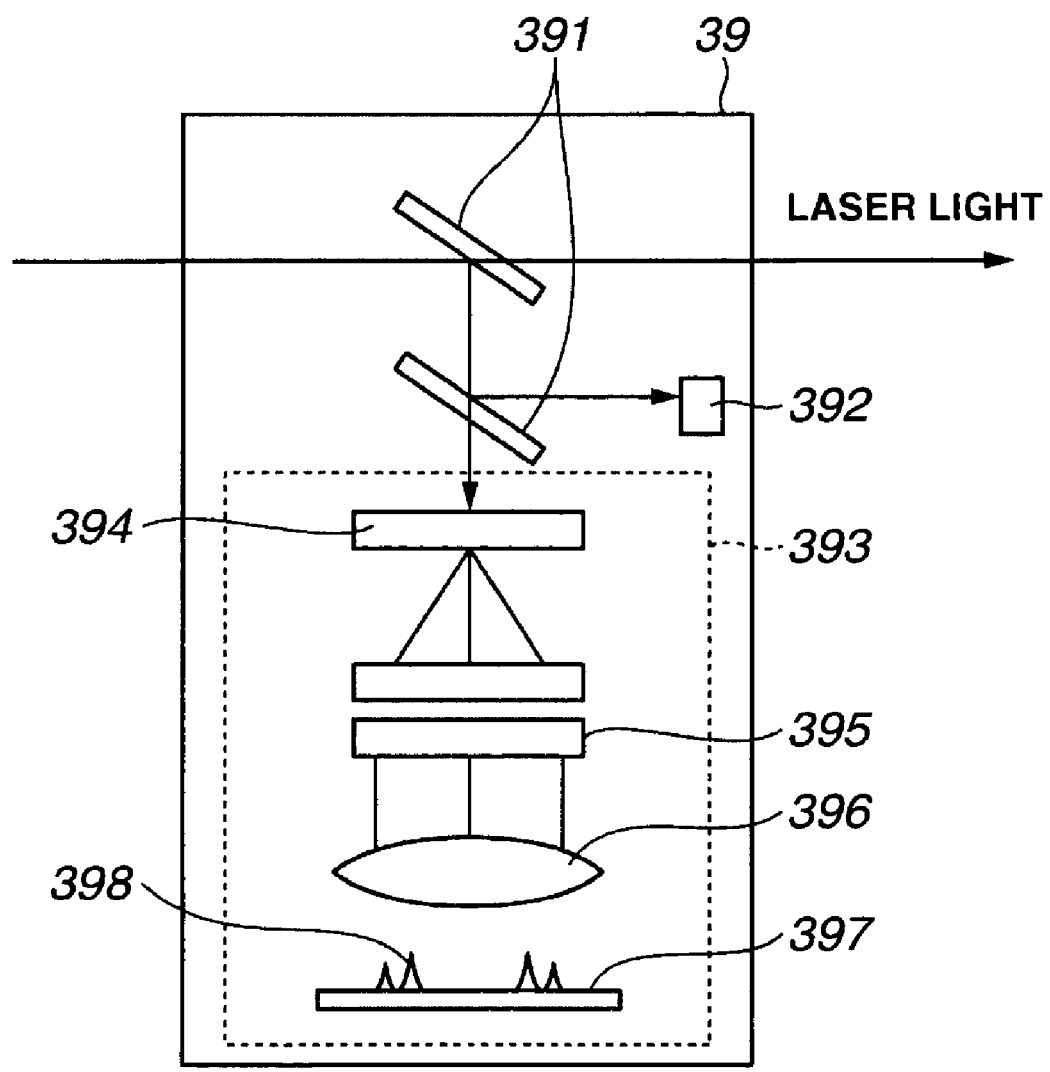
FIG. 11 is a diagram illustrating the configuration of a monitor module.

FIG. 11 shows the configuration of the monitor module.

The monitor module 39 consists of a beam splitter 391, an etalon spectrometer 393, and a photodiode 392.

In the etalon spectrometer 393, a spectral index value of such as the spectral purity width E95 is measured, and the laser output energy is measured by the photodiode 392. The etalon spectrometer 393 consists of a beam diffusing means 394 such as a diffusing plate or a lens array; an etalon 395; a lens 396; and a sensor array 397. As the sensor array 397, it is possible to use such as a line sensor in which a plurality of photodiode arrays are arranged unidimensionally. In this case, the plurality of photodiodes are arranged in the order of channels (channels: integers).

In the monitor module 39, a portion of the laser light is sampled by the beam splitter 391, and is made incident upon the etalon spectrometer 393. The laser light incident upon the etalon spectrometer 393 is diffused by the beam dispersing means 394, and is made incident upon the etalon 395. The laser light which passed through the etalon 395 is made incident upon the lens 396. The sensor array 397 is installed at the focal plane of the lens 396. For this reason, when the laser light is transmitted through the lens 396, an interference fringe is generated on the sensor array 397. From the data on the fringe on the sensor array 397, linear data on the wavelength and the quantity of light of the laser light are determined as spectral profiles, and the spectral purity width E95 is calculated.

It should be noted that although the etalon spectrometer 393 is used in the configuration of FIG. 11, an optical element of an angle dispersion type may be used as the form of the spectrometer. For example, it is possible to use a Czerny-Turner type spectrometer, a spectrometer using a plurality of gratings, and a multipath spectrometer.

Referring to FIGS. 10 and 11, a description will be given of the operation of this embodiment. A signal representing a command value of the spectral purity width E95 from the outside (from the exposure tool 3 or a paddle input of the laser), as well as a signal representing the pulse energy of the laser outputted from the monitor module 39 and the spectral purity width E95 of the laser, are inputted to the laser controller 50. Further, the laser controller 50 outputs a control signal of the spectral purity width E95 to the wavefront adjusting module 30 through the wavefront adjusting driver 51, outputs to the laser power supply a control signal of a charging voltage of the laser to control the pulse energy, and outputs a control signal of a central wavelength to the line narrowing module 20 through the central wavelength adjusting driver 52. For instance, the concave lens 33 installed in the wavefront adjusting module 30 is held on the one-axis linear stage 35. The control signal outputted from the laser controller 50 is inputted to the linear stage 35 through the wavefront adjusting driver 51, whereupon the linear stage 35 moves the concave lens 33 in the direction of the optical axis (in the left-right direction in the drawings) in response to the inputted signal. Further, the grating 21 disposed in the line narrowing module 20 is held on the rotating stage 23. The control signal outputted from the laser controller 50 is inputted to the rotating stage 23 through the central wavelength adjusting driver 52, whereupon the rotating stage 23 rotates the grating 21 in response to the inputted signal. It should be noted that wavelength control is possible if not the grating 21 but any one of the prism beam expanders 22 is installed on the rotating stage 23.

Here, a rough description will be first given of the flow of processing in accordance with this embodiment, and subsequently a description will be given of the flow of specific processing with reference to the drawings.

First, a target value of the spectral purity width E95 is inputted from the outside, and is set in the laser controller 50. The laser controller 50 controls the shutter 6, outputs a signal to the wavefront adjusting module 30 to move the concave lens 33 to the position of an origin (which is a reference position in the case of moving the concave lens 33, and is determined to be at an arbitrary position), and outputs a signal to the laser supply 53 to generate laser oscillation at a predetermined charging voltage. Then, the pulse energy of the laser is detected by the pin photodiode 392 in the monitor module 39, and the spectral purity width E95 and the central wavelength of the laser are detected by the etalon spectrometer 393. The laser controller 50 stores the detected pulse energy and spectral purity width E95. Next, the laser controller 50 outputs a signal to the wavefront adjusting module 30 to move the concave lens 33 to a predetermined position, so as to generate laser oscillation. Then, the pulse energy of the laser is detected again by the pin photodiode 392 in the monitor module 39, and the spectral purity width E95 and the central wavelength of the laser are detected by the etalon spectrometer 393. The laser controller 50 stores the detected pulse energy and spectral purity width E95. The laser controller 50 repeatedly performs the above-described operation a predetermined number of times, and stores the lens position dependency between the pulse energy of the laser and the spectral purity width E95.

Next, on the basis of the stored data on the lens position dependency, the laser controller 50 computes the lens position for adjusting the concave lens 33 to the targeted spectral purity width E95, and outputs a command signal to the wavefront adjusting driver 51. The wavefront adjusting driver 51 outputs a position signal to the linear stage 35. The linear stage 35 moves the concave lens 33 in response to the position signal. Thus, the laser controller 50 carries out feedback control to allow the calculated value of the spectral purity width E95 to agree with the target value. In addition, the laser controller 50 controls the laser supply to adjust the pulse energy to the target energy. Further, the laser controller 50 outputs to the central wavelength adjusting driver 52 a command signal for adjusting the oscillated wavelength of the laser to the target wavelength. The central wavelength adjusting driver 52 outputs a rotation signal to the rotating stage 23. The rotating stage 23 rotates the grating 21 in response to the rotation signal. Thus, the laser controller 50 carries out feedback control to allow the calculated value of the spectral purity width E95 to agree with the target value.

After confirming that the pulse energy of the laser, the spectral purity width E95, and the central wavelength have been controlled to within the allowable ranges, the laser controller 50 opens the shutter 6. The laser light is made incident upon the exposure tool 3, and the semiconductor wafer is exposed.

Figure 12:
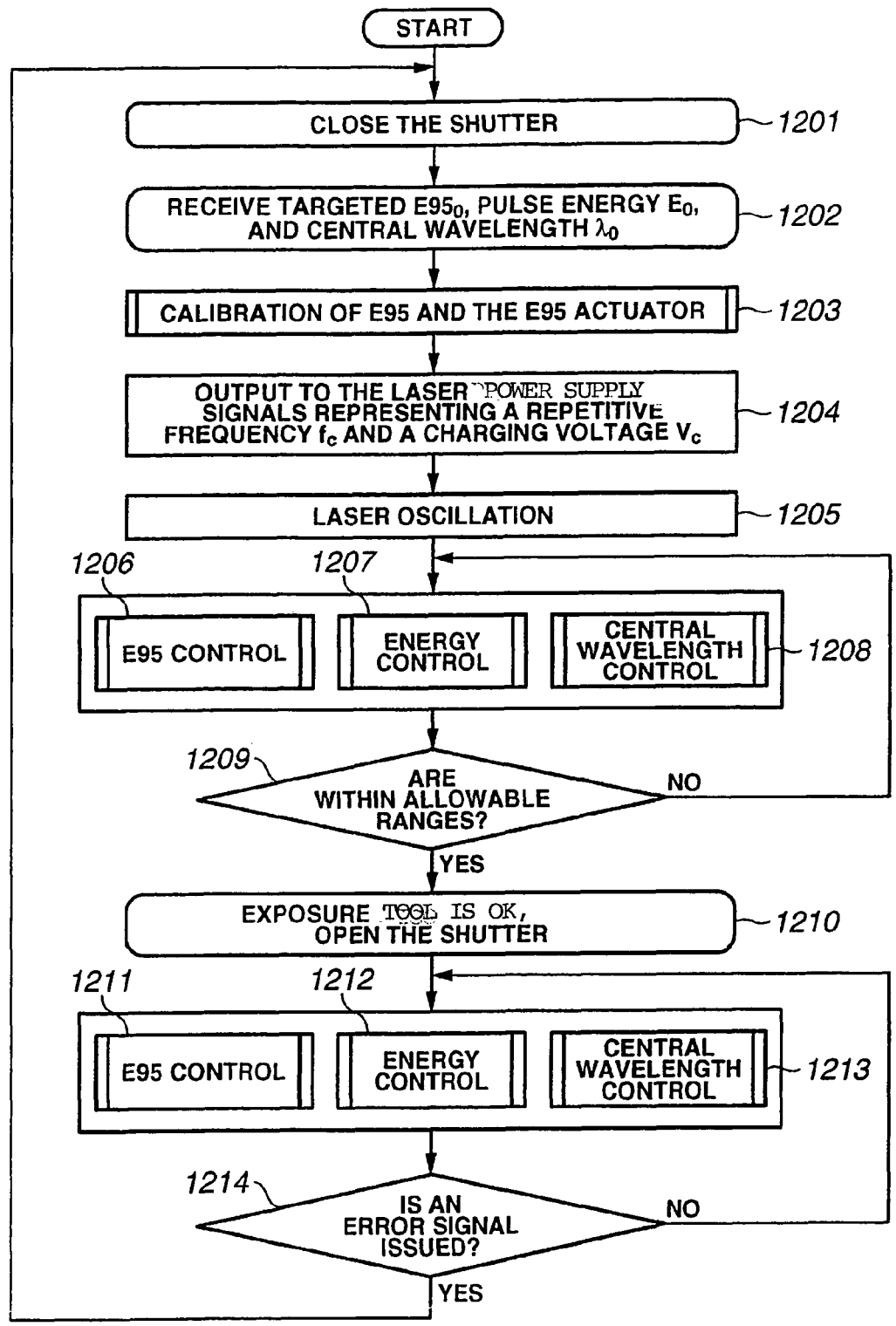
FIG. 12 is a diagram illustrating a flowchart of a main routine which is carried out in the laser system in accordance with the fifth embodiment.

FIG. 12 shows a flowchart of a main routine which is carried out in the laser system in accordance with the fifth embodiment.

Figure 13:
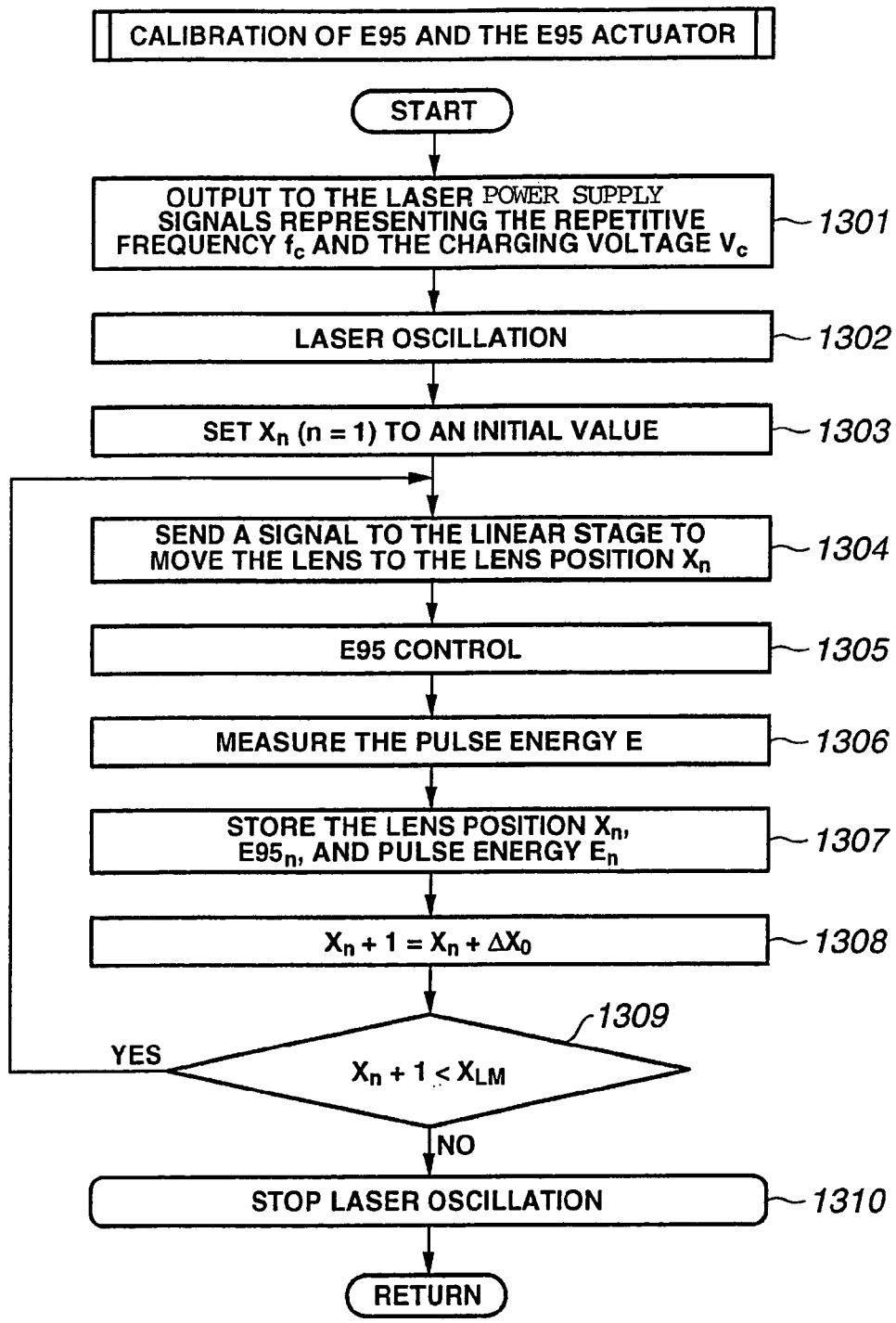
FIG. 13 is a diagram illustrating a flowchart of a subroutine of "calibration of the spectral purity width E95 and the E95 actuator;"

First, the shutter 6 is closed by the laser controller 50 before effecting the control of the spectral purity width E95 (Step 1201). As the shutter 6 is closed, the laser light due to the operation of adjustment oscillation is not inputted to the exposure tool 3. In this state, set values of the targeted pulse energy, spectral purity width E95, and central wavelength outputted from an external device (the exposure tool 3 or a paddle) and the like are read by the laser controller 50 (Step 1202). Then, the operation proceeds to the subroutine of "calibration of the spectral purity width E95 and the E95 actuator" (Step 1203). In this subroutine, dependency of a correction value of wavefront adjustment (e.g., the distance D between the principal points of the lenses) on the pulse energy of the laser and the spectral purity width E95 is stored. The specific details of the subroutine of "calibration of the spectral purity width E95 and the E95 actuator" will be described later (FIG. 13).

Upon completion of the processing of the subroutine of "calibration of the spectral purity width E95 and the E95 actuator," output signals representing a repetitive frequency $f_c$ and a charging voltage $V_c$ are sent from the laser controller 50 to the laser supply 53 so as to set the oscillating conditions of the laser (Step 1204). Then, a trigger signal is sent to the laser supply 53 to generate a discharge between the discharge electrodes 11 and 12 in the laser chamber 10, and laser oscillation is started (Step 1205).

Figure 15:
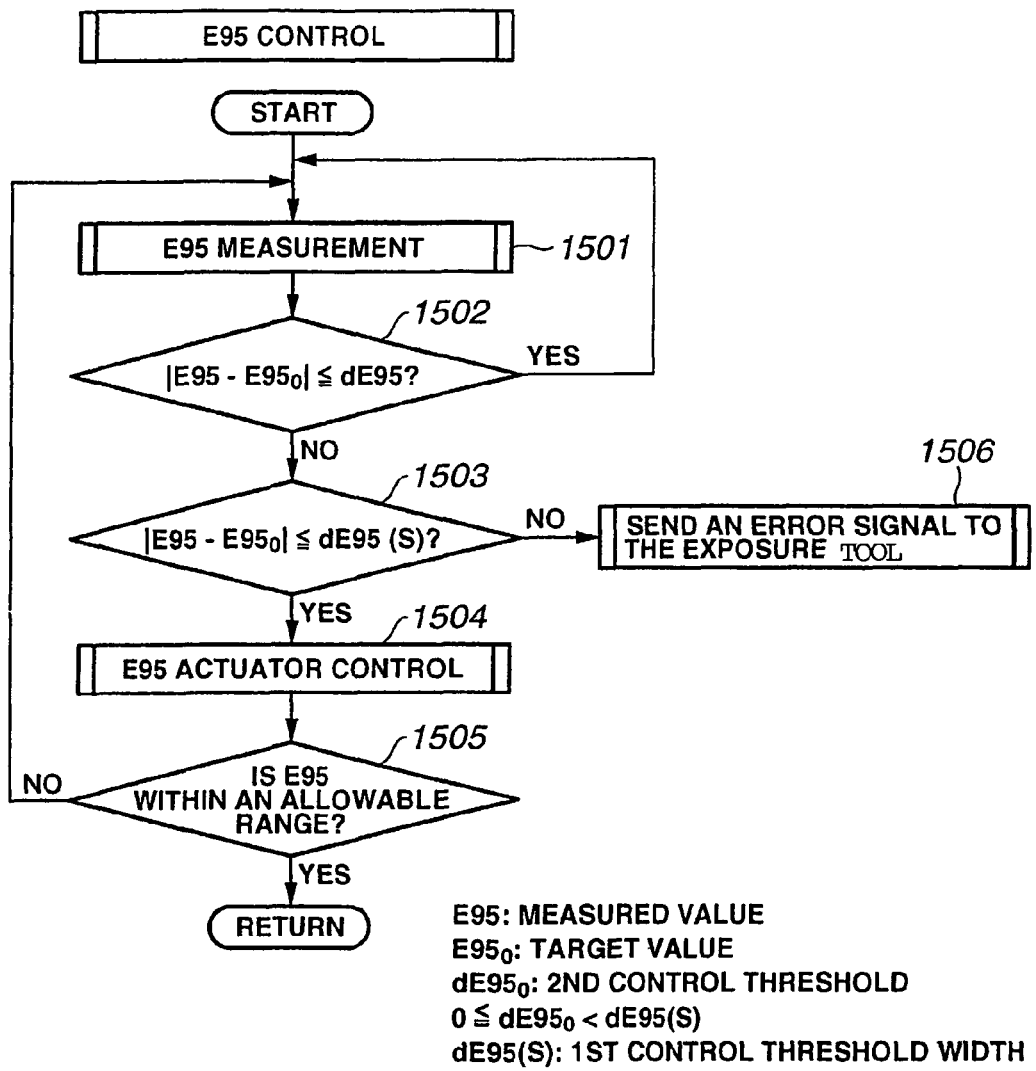
FIG. 15 is a diagram illustrating a flowchart of a subroutine of "E95 control;"
Figure 17:
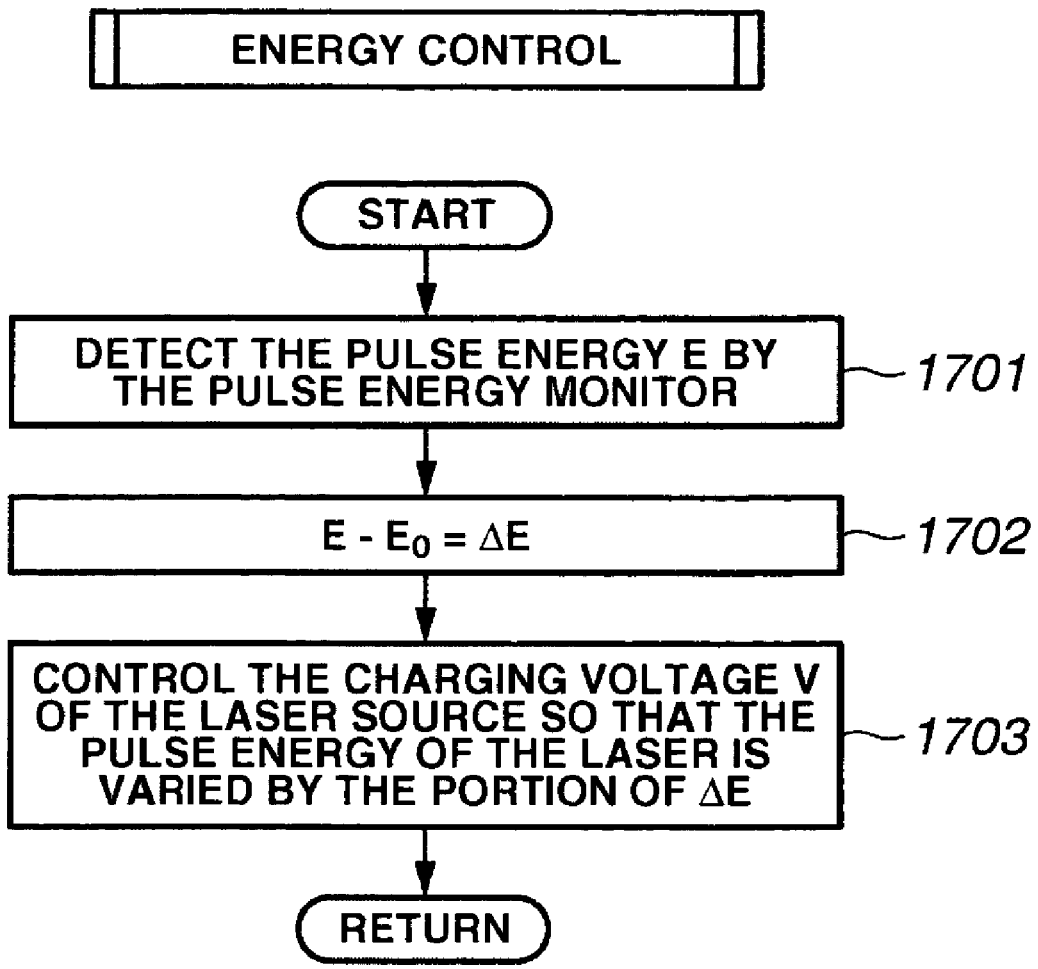
FIG. 17 is a diagram illustrating a flowchart of a subroutine of "energy control;"
Figure 18:
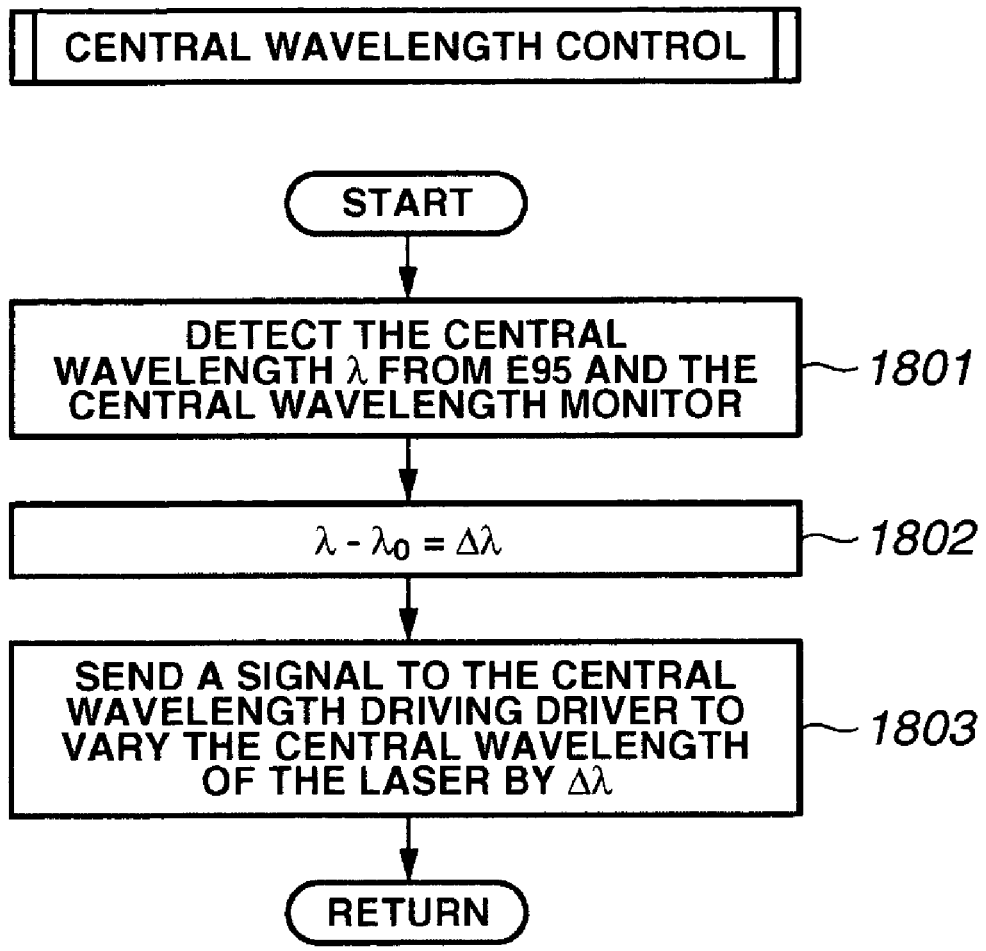
FIG. 18 is a diagram illustrating a flowchart of a subroutine of "central wavelength control;"

Here, the operation proceeds to a subroutine of "E95 control" for setting the spectral purity width E95 to a target value (Step 1206), a subroutine of "energy control" for setting a pulse energy E to a target value (Step 1207), and a subroutine of "central wavelength control" for setting a central wavelength λ to a target value (Step 1208). In the respective subroutines, processing ends when controlled objects (the spectral purity width E95, the pulse energy E, and the central wavelength λ) have fallen within allowable ranges, whereas processing is repeated when they have not fallen within the allowable ranges. The specific details of the respective subroutines will be described later (FIGS. 15, 17, and 18).

When the controlled objects have fallen within the allowable ranges, an OK signal for exposure preparation is sent from the laser controller 50 to the exposure tool 3, and the shutter 6 is opened (YES in the determination in Step 1209, Step 1210). The laser light is guided to the exposure tool 3, and the exposure of the semiconductor wafer is started. At the time of the exposure, the operation proceeds to the subroutine of "E95 control" (Step 1211), the subroutine of "energy control" (Step 1212), and the subroutine of "central wavelength control" (Step 1213), and feedback control is provided to set the pulse energy E, the spectral purity width E95, and the central wavelength λ to target values. At the time of the exposure, when an error has occurred in at least the spectral purity width E95, an error signal is issued. If the error signal is issued, an abnormality is notified from the laser controller 50 to the exposure tool 3, and the processing in Step 1201 and thereafter is carried out again (YES in the determination in Step 1214).

FIG. 13 shows a flowchart of the subroutine of "calibration of the spectral purity width E95 and the E95 actuator."

First, output signals representing the repetitive frequency $f_c$ and the charging voltage $V_c$ for setting the oscillating conditions of the laser are sent from the laser controller 50 to the laser supply 53 (Step 1301). Then, a trigger signal is sent to the laser supply 53 to generate a discharge between the discharge electrodes 11 and 12 in the laser chamber 10, and laser oscillation is started (Step 1302).

Figure 14:
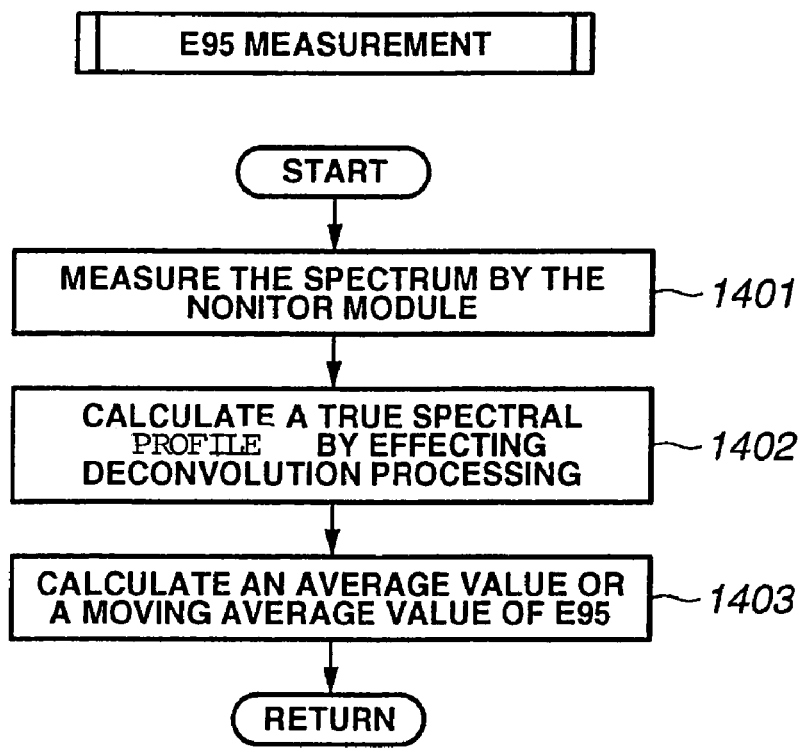
FIG. 14 is a diagram illustrating a flowchart of a subroutine of "E95 measurement;"

Next, a signal is outputted from the laser controller 50 to the wavefront adjusting driver 51 to set the position of the concave lens 33 to an initial value $X_n$ (Step 1303). The wavefront adjusting driver 51 controls the linear stage 35 (Step 1304). Here, the operation proceeds to the subroutine of "E95 measurement" (Step 1305). The specific details of the subroutine of "E95 measurement" will be described later (FIG. 14). After the subroutine of "E95 measurement," the pulse energy E of the laser is measured by the monitor module 39 (Step 1306). Then, a position $X_n$ of the concave lens 33, the spectral purity width $E95_n$, and a pulse energy $E_n$ of the laser at this time are stored (Step 1307). Further, an ensuing position $X_{n+1}=X_n+\Delta X_0$ of the concave lens 33 is calculated (Step 1308). This $\Delta X_0$ is a predetermined moving pitch of the linear stage 35.

If the ensuing position $X_{n+1}$ of the concave lens 33 is smaller than a limit position $X_{LM}$ of the concave lens 33, $X_{n+1}$ is set to $X_n$, and the processing in Step 1304 and thereafter is repeated (YES in the determination in Step 1309). If the position $X_{n+1}$ of the concave lens 33 has exceeded the limit position $X_{LM}$ of the concave lens 33, the oscillation of the laser is stopped, and the operation returns to the main routine shown in FIG. 12 (NO in the determination in Step 1309, Step 1310). FIG. 14 shows a flowchart of the subroutine of "E95 measurement."

After starting the subroutine, the spectral profile is measured by the monitor module 39 (Step 1401). The measured spectral profile is subjected to deconvolution processing, and a true spectral profile is calculated (Step 1402). Next, an average value or a moving average value of the spectral purity width E95 is determined by calculation (Step 1403). After the above-described processing, the operation returns to the subroutine prior to proceeding to this subroutine (FIG. 13 or FIG. 15 which is referred to later).

FIG. 15 shows a flowchart of the subroutine of "E95 control."

As shown in FIG. 15, the operation proceeds to Step 1501 simultaneously with the laser oscillation, and the subroutine of "E95 measurement" (FIG. 14) is executed to measure the spectral purity width E95 by the monitor module 39. The spectral purity width E95 is measured for each one pulse. However, the spectral purity width E95 may be evaluated by an average value over n pulses or a moving average value in view of the calculation time.

By setting the value of the target spectral purity width of the spectral purity width E95 as $E95_0$, a first allowable width for the target spectral purity width E95 is set as $E95_0 \pm dE95(s)$ (a first control threshold of dE95(s)). The first allowable width of $E95_0 \pm dE95(s)$ for the target spectral purity width E95 is set in accordance with the specifications required by the exposure tool 3. Control needs to be provided to prevent the spectral purity width E95 from falling outside the first allowable width required by the exposure tool 3 by exceeding its upper limit of $E95_0+dE95(s)$ or falling below its lower limit of $E95_0+dE95(s)$. For this reason, a second control threshold of dE95 provided with a predetermined margin (dE95(s)−dE95), i.e., a second allowable width of $E95_0 \pm dE95$ for the target spectral purity width E95, is set. The range of the second control threshold of dE95 is $0 \leq E95_0 \leq dE95(s)$. When dE95=0, if the measured value of the spectral purity width E95 deviates even slightly from the target value of $E95_0$, the linear stage 35 is operated in response to a command from the laser controller 50 to allow the measured value of E95 to agree with the target value of $E95_0$, thereby executing stabilization control.

After the actual spectral purity width E95 has been measured, a calculation is made of whether or not the absolute value of a difference between the measured value of E95 and the target value of $E95_0$ is less than or equal to the second control threshold of dE95, i.e., whether or not the measured spectral purity width E95 is kept within the second allowable width of $E95_0 \pm dE95$ (Step 1502).

If the absolute value of the difference between the measured value of E95 and the target value of $E95_0$ is less than or equal to the second control threshold of dE95, i.e., if E95−$E95_0 \leq dE95$, stabilization control of the spectral purity width E95 is not executed (YES in the determination in Step 1502). On the other hand, if the absolute value of the difference between the measured value of E95 and the target value of $E95_0$ exceeds the second control threshold of dE95, i.e., if (E95−$E95_0$<dE95(s)) (Step 1503). As a result, when the absolute value of the difference between the measured value of E95 and the target value of $E95_0$ is greater than or equal to the first control threshold of dE95(NO in the determination in Step 1503), the error signal is sent to the exposure tool 3 to stop the laser oscillation or close the shutter 6 interposed between the exposure tool 3 and the laser apparatus 2, so as to prevent the laser light whose spectral purity width has deviated from the first allowable width from entering the exposure tool 3 (Step 1506).

On the other hand, if the absolute value of the difference between the measured value of E95 and the target value of $E95_0$ is lower than the first control threshold of dE95(s) (YES in the determination in Step 1503), the operation proceeds to the subroutine of "E95 actuator control" to allow the measured value of E95 to agree with the target value of $E95_0$, and the E95 actuator is operated to execute stabilization control (Step 1504). The specific details of the subroutine of "E95 actuator control" will be described later (FIG. 16).

As a result of the processing of the subroutine of "E95 actuator control," if the spectral purity width E95 has fallen within the allowable width, the operation returns to the main routine in FIG. 12 (YES in the determination in Step 1505). If the spectral purity width E95 does not fall within the allowable width, the processing in Step 1501 and thereafter is repeated (NO in the determination in Step 1505).

Figure 16:
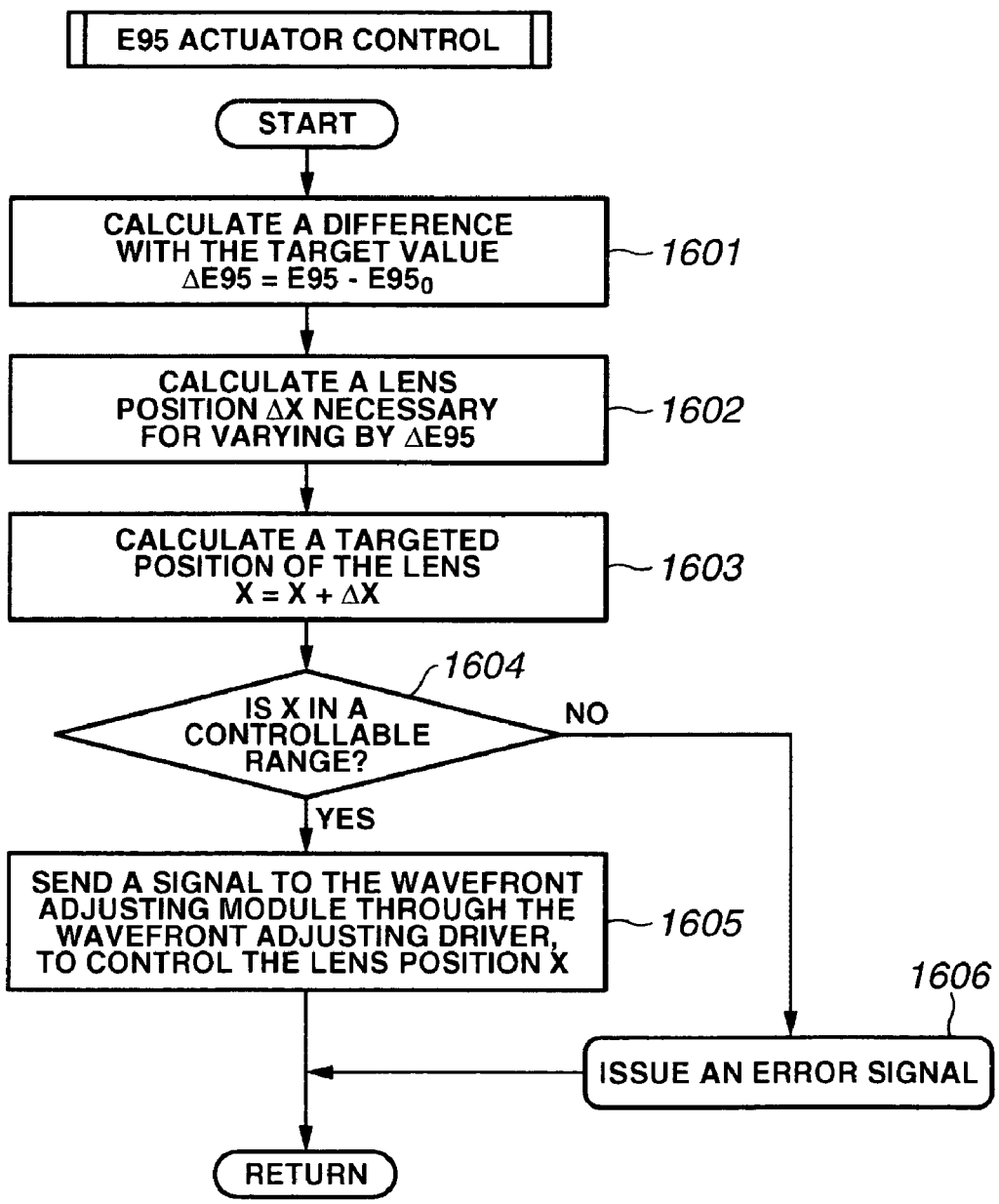
FIG. 16 is a diagram illustrating a flowchart of a subroutine of "E95 actuator control;"

FIG. 16 shows a flowchart of the subroutine of "E95 actuator control."

First, a calculation is made of a difference $\Delta E95$ (=E95 $-E95_0$) between the calculated value and the target value of the spectral purity width E95 (Step 1601). Here, a lens position $\Delta X$ necessary for varying the lens position by $\Delta E95$ is calculated on the basis of the relationship between the spectral purity width E95 and the position X of the concave lens 33 which was stored in the subroutine of "calibration of the spectral purity width E95 and the E95 actuator" shown in FIG. 13 (Step 1602). It should be noted that concerning "the relationship between the spectral purity width E95 and the position X of the concave lens 33" and "a specific example of calculation of the lens position X," a description will be given later with reference to FIG. 19.

Next, a targeted position X ($X=X+\Delta X$) of the concave lens 33 is calculated (Step 1603). Then, a determination is made as to whether or not the calculated position X of the concave lens 33 is within the allowable range (Step 1604). If the calculated position X of the concave lens 33 is within the allowable range, a signal is outputted from the laser controller 50 to the linear stage 35 of the wavefront adjusting module 30 through the wavefront adjusting driver 51. The laser controller 35 actually controls the concave lens 33 to the position X (YES in the determination in Step 1604, Step 1605). On the other hand, if the position X of the concave lens 33 is not within the allowable range, the error signal is issued (NO in the determination in Step 1604, Step 1606). It should be noted that a description will be also given later of the allowable range of the position X of the concave lens 33 with reference to FIG. 19. After the above-described processing, the operation returns to the subroutine of "E95 control" shown in FIG. 15.

FIG. 17 shows a flowchart of the subroutine of "energy control."

First, the pulse energy E of the laser is detected by the pin photodiode 392 provided in the monitor module 39 (Step 1701). Next, a calculation is made of a difference $\Delta E$ (=$E-E_0$) between the detected pulse energy E and a target energy $E_0$ (Step 1702). Then, the charging voltage V of the laser power supply 53 is controlled by the laser controller 50 so that the pulse energy of the laser is varied by the portion of $\Delta E$ (Step 1703). Upon completion of the above-described processing, the operation returns to the main routine shown in FIG. 11.

FIG. 18 shows a flowchart of the subroutine of "central wavelength control."

First, the central wavelength $\lambda$ of the laser is detected by the etalon spectrometer 393 provided in the monitor module 39 (Step 1801). Next, a calculation is made of a difference $\Delta \lambda$ (=$\lambda - \lambda 0$) between the detected central wavelength $\lambda$ and a target central wavelength $\lambda 0$ (Step 1802). Then, a signal is outputted from the laser controller 50 to the rotating stage 23 in the line narrowing module 20 through the central wavelength adjusting driver 52 so that the central wavelength of the laser is varied by the portion of $\Delta \lambda$. The rotating stage 23 controls the installation angle of the grating 21 (Step 1803). Upon completion of the above-described processing, the operation returns to the main routine shown in FIG. 11.

Figure 19:
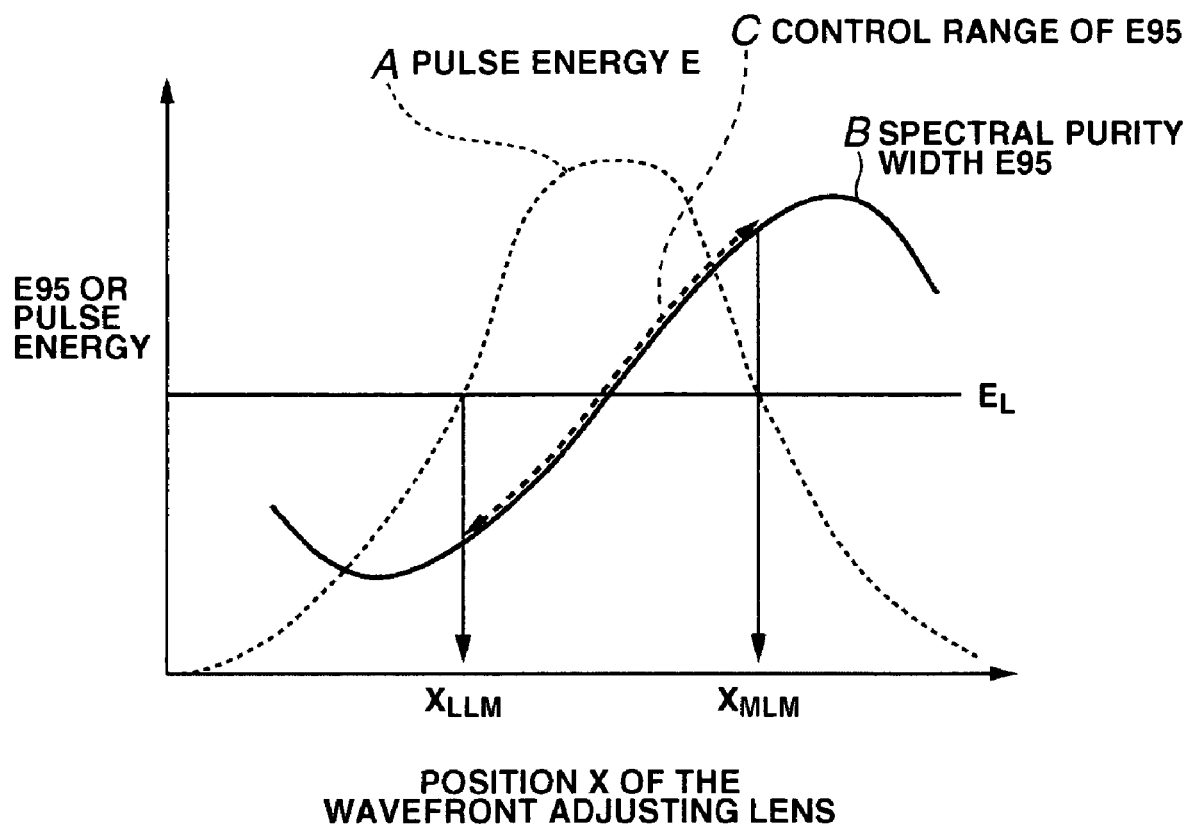
FIG. 19 is a diagram illustrating the relationship between, on the one hand, the position of the concave lens and, on the other hand, the spectral purity width E95 and a pulse energy E of the laser.

FIG. 19 shows the relationship between, on the one hand, the position of the concave lens and, on the other hand, the spectral purity width E95 and the pulse energy E of the laser, and this is the relationship which is stored in the subroutine of "calibration of the spectral purity width E95 and the E95 actuator" shown in FIG. 13. In FIG. 19, the broken line A shows the pulse energy E, and the solid line B shows the spectral purity width E95.

As shown in FIG. 19, if a necessary pulse energy $E_L$ is set, a lower limit $X_{LLM}$ and an upper limit $X_{MLM}$ of the position X of the concave lens 33 of the wavefront adjusting module 102 are determined. The upper and lower limits $X_{MLM}$ and $X_{LLM}$ of the position X of the concave lens 33 are stored as the allowable range of the position X of the concave lens 33. This allowable range is used in the subroutine of "E95 actuator control" shown in FIG. 16.

When the upper and lower limits $X_{MLM}$ and $X_{LLM}$ of the position X of the concave lens 33 are determined, the range of the spectral purity width E95 is also determined. In FIG. 19, the range of the broken line C indicates the variable range of the spectral purity width E95. In this range, a gradient value $\Delta E95/\Delta X$ at the position X of the concave lens 33 is stored. This gradient value is used at the time of calculation of the lens position $\Delta X$ in the subroutine of "E95 actuator control" shown in

FIG. 15.

Sixth Embodiment

In a sixth embodiment, a description will be given of a form different from the fifth embodiment.

Figure 20:
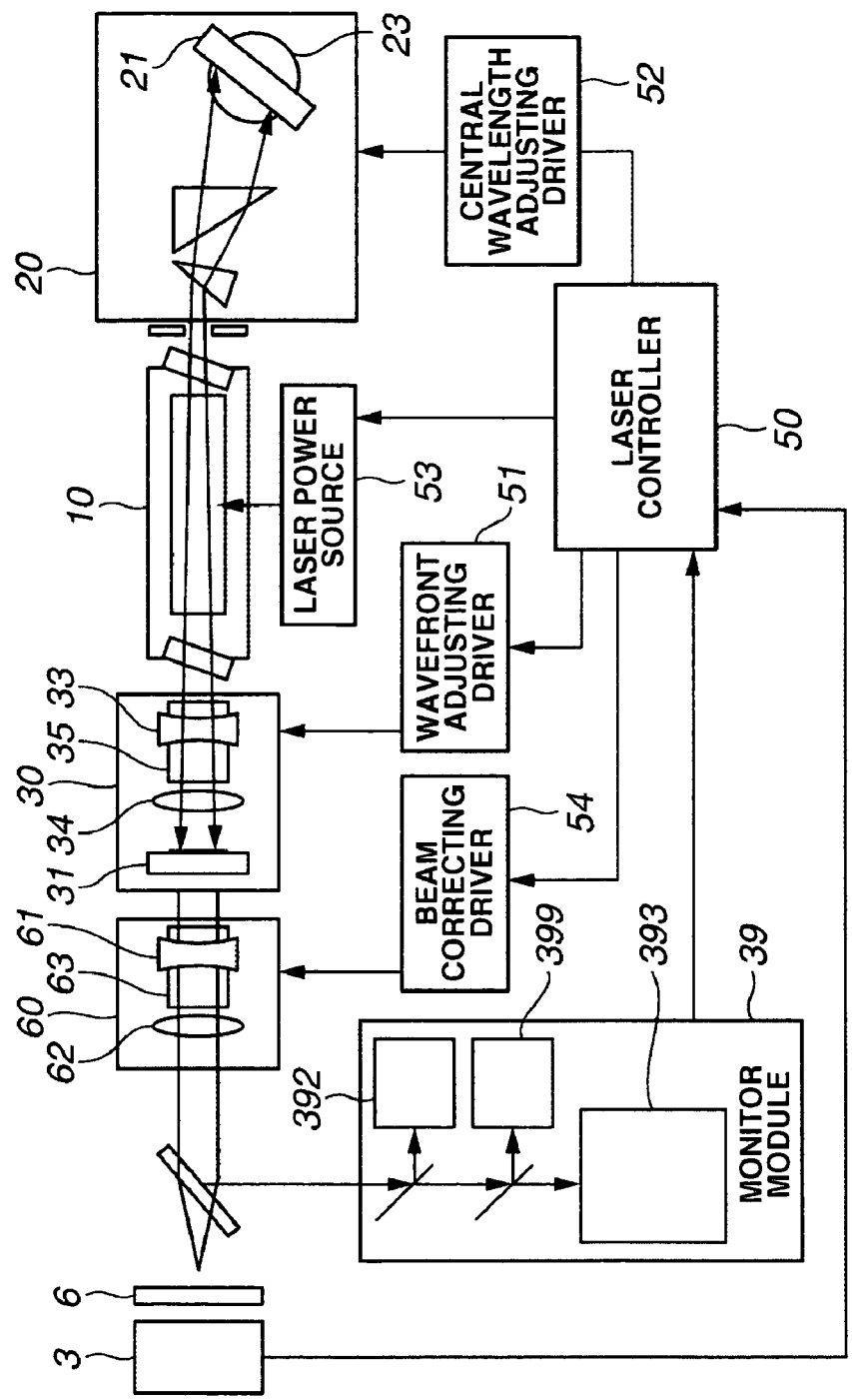
FIG. 20 is a diagram illustrating the configuration of a control system for controlling the spectral purity width E95 in accordance with a sixth embodiment.

FIG. 20 shows the configuration of a control system for controlling the spectral purity width E95 in accordance with the sixth embodiment, and shows an example in which a beam correcting module is added to the configuration shown in FIG. 10.

Since the configuration of the sixth embodiment is substantially identical to the configuration of the fifth embodiment, a description will be given herein of only differences in the configuration.

If the linear stage 35 provided in the wavefront adjusting module 30 is operated, the spectral purity width E95 is varied, and the beam profile and the beam divergence of the output laser light is concurrently varied. Accordingly, in this embodiment, a beam correcting module 60 is disposed on the output side of the wavefront adjusting module 30. In addition, a beam correcting driver 55 for controlling the beam correcting module 60 is provided, and a beam monitor 399 is provided in the monitor module 39. On the basis of a signal detected by the beam monitor 399, the laser controller 50 sends a signal to the beam correcting module 60 through the beam correcting driver 55, to thereby provide control so that the quality of the laser light incident upon the exposure tool 3 falls within a predetermined range.

In this embodiment, concave and convex lenses 61 and 62 are used as the beam correcting module 60. The concave lens 61 is held on a linear stage 63 so as to be movable on the optical axis. It should be noted that the convex lens 62 may be held on the linear stage. Beam correction becomes possible by controlling the distance between the concave and convex lenses 61 and 62.

A description will be given of a specific example of the beam monitor 399 with reference to FIGS. 21A and 21B.

Figure 21A:
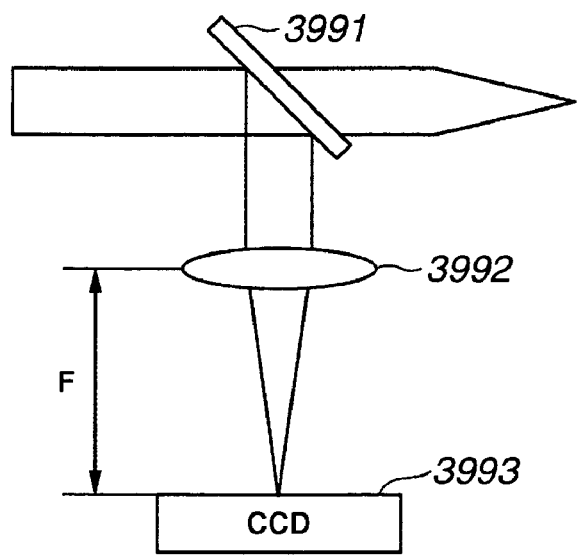
FIG. 21A is a diagram illustrating the configuration of a beam divergence monitor.

FIG. 21A shows the configuration of a beam divergence monitor.

A beam splitter 3991 is disposed on the optical axis of the laser light, a focusing lens 3992 is disposed on the optical axis of the light subjected to sampling by the beam splitter 3991, and a CCD 3993 is disposed at the focal position of the focusing lens 3992. A portion of the laser light is sampled by the beam splitter 3991, is transmitted through the focusing lens 3992, and is applied to the CCD 3993. A beam divergence D of the laser light can be measured by measuring a diameter P of the spot light on the CCD 3993. The beam divergence D can be calculated from a focal distance F of the focusing lens 3992 and the diameter P of the spot light (D=P/F).

Figure 21B:
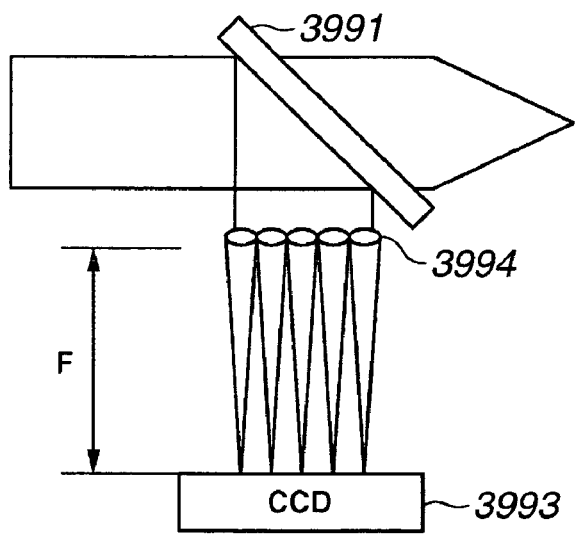
FIG. 21B is a diagram illustrating the configuration of a Shack-Hartmann wavefront sensor.

FIG. 21B shows the configuration of a Shack-Hartmann wavefront sensor.

The beam slitter 3991 is disposed on the optical axis of the laser light, a microlens array 3994 is disposed on the optical axis of the light subjected to sampling by the beam splitter 3991, and the CCD 3993 is disposed at the focal position of the microlens array 3994. A portion of the laser light is sampled by the beam splitter 3991, is transmitted through the microlens array 3994, and is applied to the CCD 3993. The profile of the wavefront of the laser light can be measured by measuring the respective positions of the spot light on the CCD 3993.

Further, although not shown, a beam profiler of the laser may be installed as the beam monitor 399 to detect the size of the laser beam, and a signal may be sent to the beam correcting module through a beam correcting actuator so as to stabilize the beam width of the laser on the basis of that detected value.

Figure 22:
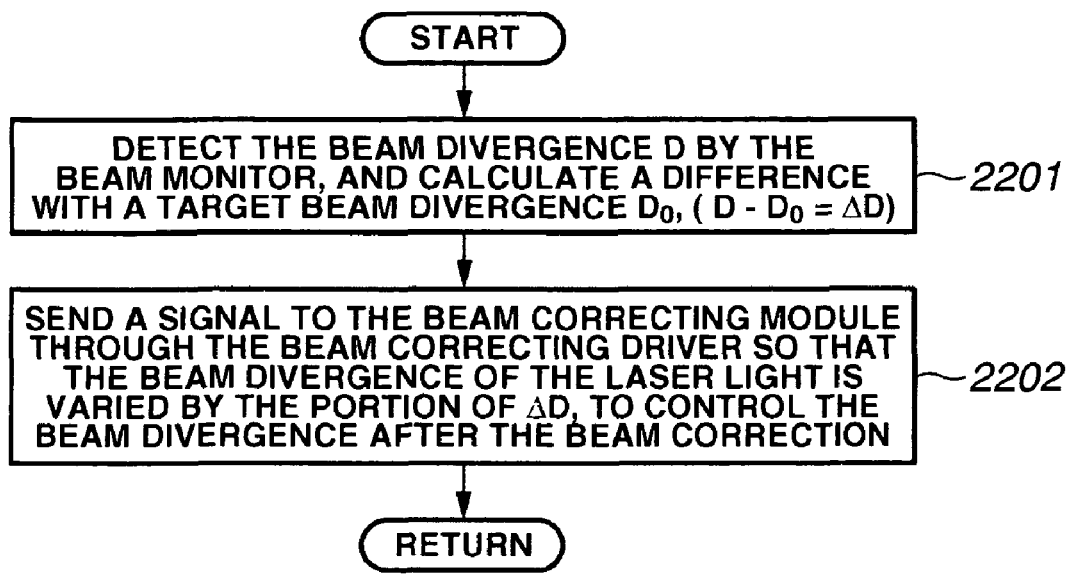
FIG. 22 is a diagram illustrating a flowchart of beam correction control.

FIG. 22 shows a flowchart of beam correction control. FIG. 22 is one example of the flow in a case where the beam divergence monitor shown in FIG. 21 A is used as the beam monitor 399.

First, the beam divergence D is detected, and a calculation is made of a difference $\Delta D$ (=D−$D_0$) between the detected beam divergence D and a targeted beam divergence $D_0$ (Step 2201). Then, a signal is outputted from the laser controller 50 to a linear stage 263 of the beam correcting module 60 through the beam correcting driver 55 so that the beam divergence of the laser is varied by the portion of $\Delta D$. The linear stage 263 controls the position of the concave lens 61 (Step 2202).

Figure 23:
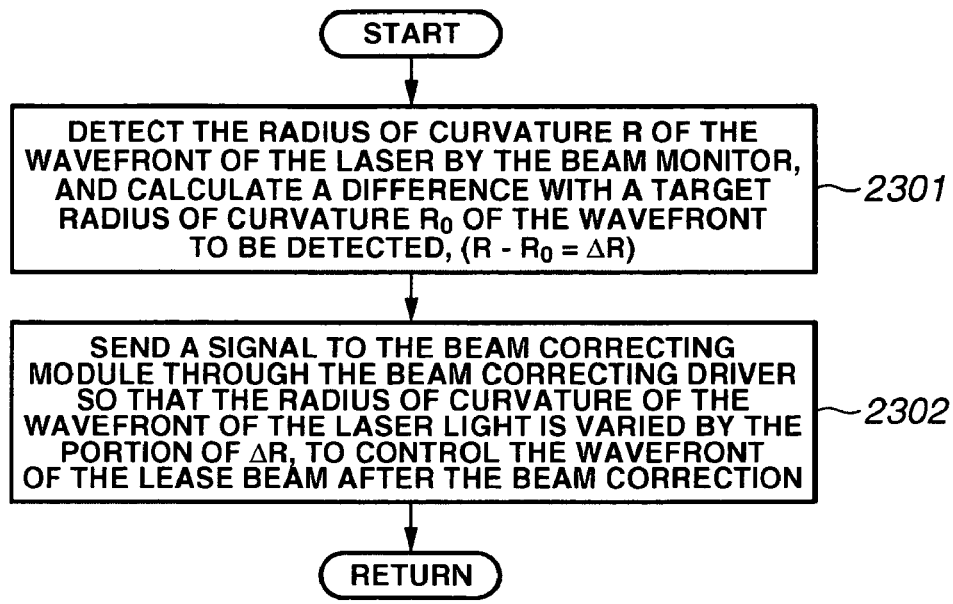
FIG. 23 is a diagram illustrating a flowchart of beam correction control.

FIG. 23 shows a flowchart of beam correction control. FIG. 23 is one example of the flow in a case where the beam divergence monitor shown in FIG. 21A is used as the beam monitor 399.

First, a radius of curvature R of the wavefront of the output light of the laser is detected, and a calculation is made of a difference $\Delta R$ (=R−$R_0$) between the detected radius of curvature R and a targeted radius of curvature $R_0$ (Step 2301). Then, a signal is outputted from the laser controller 50 to the linear stage 263 of the beam correcting module 60 through the beam correcting driver 55 so that the radius of curvature R of the wavefront of the laser is varied by the portion of $\Delta R$. The linear stage 263 controls the position of the concave lens 61 (Step 2302).

According to this embodiment, the beam quality of the light which is outputted to the exposure tool becomes stable.

For this reason, control of exposure homogeneity of the semiconductor wafer and control of exposure dose can be carried out stably.

In this embodiment, feedback control is provided by sending a control signal to the beam correcting module by monitoring the beam of the laser, but the present invention is not limited to the same. For example, the beam may be controlled by inputting a control signal to the beam correcting module by estimating and calculating the variation of the beam from a control value outputted to the wavefront adjusting module.

Seventh Embodiment

In this embodiment, a description will be given of a form in which the laser system described in the sixth embodiment is applied to a double-chamber laser system.

Figure 24:
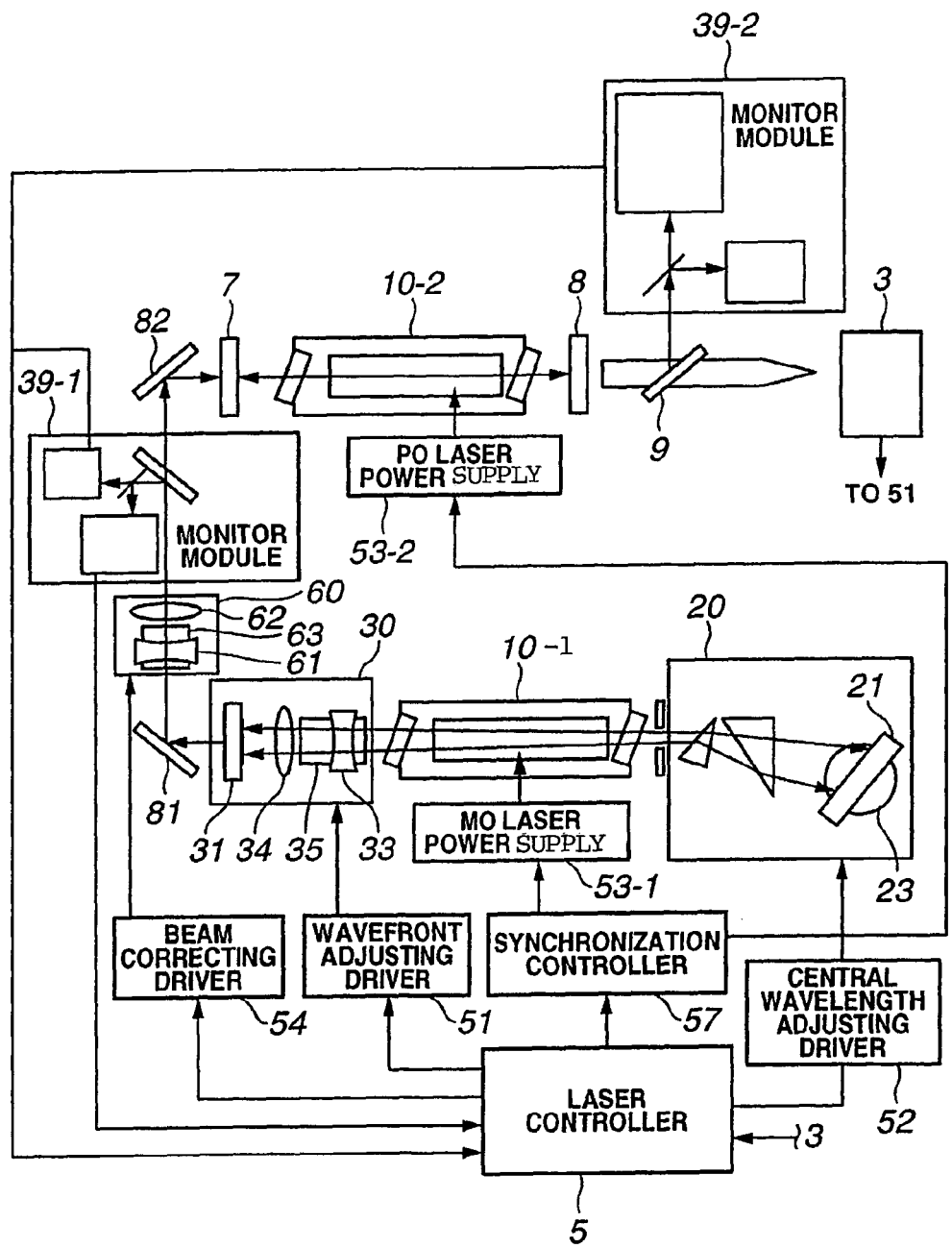
FIG. 24 is a diagram illustrating the configuration of a laser system in a case where the sixth embodiment is applied to a double-chamber system.

FIG. 24 shows the configuration of a laser system in the case where the sixth embodiment is applied to the double-chamber system.

The double chamber system shown in FIG. 24 has a master oscillator (MO) for oscillating line narrowed light and a power oscillator (PO) for generating amplified oscillation by using the line narrowed light as seed light, and this system is referred to as an MOPO system.

In this embodiment, the configuration of the sixth embodiment is applied to the MO side. In the MO, the line narrowing module 20 is disposed on the rear side of an MO laser chamber 10-1, and the wavefront adjusting module 30 is disposed on the front side thereof.

A mirror 81 having a high reflection film (HR film) coated on its surface for orthogonally reflecting the seed light outputted from the wavefront adjusting module 30 is disposed on the output side of the wavefront adjusting module 30. An MO monitor module 39-1 is disposed on the output side of the beam correcting module 60. A mirror 82 having the HR film coated on its surface for orthogonally reflecting the seed light outputted from the MO monitor module 39-1 is disposed on the output side of the MO monitor module 39-1. The PO is configured on the output side of the mirror 82. In the PO, a rear mirror 7 is disposed on the rear side of a PO laser chamber 10-2, and a PO output coupler 8 is disposed on the front side thereof. On the output side of the PO output coupler 8, a beam slitter 9 is disposed, and a PO monitor module 39-2 is further disposed. It should be noted that the rear mirror 7 may be a mirror with the PR film coated thereon, or may be a mirror for spatially transmitting a portion of the light.

The MO outputs the light of a predetermined spectral purity width E95. The light is reflected by the mirror 81, is transmitted through the wavefront adjusting module 60, and is incident upon the MO monitor module 39-1. A portion of the light is transmitted through the MO monitor module 39-1, but a portion of the light is sampled, and the pulse energy of the MO and the beam are detected. The light transmitted through the MO monitor module 39-1 is reflected by the mirror 82, and is incident from the rear mirror 7 of the PO as the seed light. The seed light is amplified and oscillated with its spectrum maintained by the PO laser chamber 10-2 and the output coupler 8, and is outputted as the laser light. A portion of the laser light is transmitted through the beam slitter 9, and a remaining portion of it is reflected and is incident upon the PO monitor module 39-2. In the PO monitor module 39-2, the pulse energy and the spectral purity width E95 are detected.

Detected values of the pulse energy of the MO and the beam are inputted to the laser controller 50 from the MO monitor module 39-1, and detected values of the pulse energy of the PO, the E95, and the central wavelength are inputted thereto from the PO monitor module 39-2. The laser controller 50 carries out feedback control on the basis of the inputted detected values. On the basis of the detected values of the pulse energy of the MO and the pulse energy of the PO, the laser controller 50 sends control signals of discharge timings and the discharge voltage values for the MO and the PO to an MO laser supply 53-1 and a PO laser supply 53-2 through a synchronization controller 57. In addition, on the basis of the detected result of the spectral purity width E95, the laser controller 50 sends a control signal to the wavefront adjusting module 30. Further, on the basis of the detected value of the beam monitor, the laser controller 50 sends a control signal to the beam correcting module 60 through the beam correcting driver 54. Furthermore, on the basis of the detected value of the central wavelength, the laser controller 50 sends a control signal to the line narrowing module 20 through the central wavelength driving driver 51. The respective actuators provided in the line narrowing module 20, the wavefront adjusting module 30, and the beam correcting module 60 are operated in response to the control signals.

It should be noted that although in this embodiment the example of the MOPO system is shown, the present invention is not limited to the same, and similar control is possible if the operation is carried out as a power amplifier with the resonator of the PO omitted. Further, although only the wavefront adjusting module 30 of the MO is controlled for controlling the spectral purity width E95, the present invention is not limited to the same, another means or varying the spectral purity width E95 may be combined. The means for varying the spectral purity width E95 includes, for example, a method for varying the synchronization timing of the MO and the PO.

What is claimed is:

1. A line narrowed laser apparatus comprising:
   a laser medium;
   an exciting source for exciting the laser medium;
   an optical resonator having a wavelength dispersive element disposed on a rear side of the laser medium and a partial transmission-type output coupler which is disposed on a front side of the laser medium; and
   a wavefront adjuster for obtaining a desired spectral purity width disposed on the front side of the laser medium on an optical axis between the laser medium and the partial transmission-type output coupler, said wavefront adjuster receiving light in a form of a spherical wave from a side of the laser medium, adjusting a wavefront of the light in the form of a spherical wave and outputting the light having the wavefront adjusted to a side of the partial transmission-type coupler, to thereby obtain the desired spectral purity width.

2. The line narrowed laser apparatus according to claim 1, further comprising a wavefront adjusting control unit for sampling the light outputted from the partial transmission-type output coupler and feedback controlling the wavefront adjuster to obtain a desired spectral width.

3. The line narrowed laser apparatus according to claim 1, wherein the wavefront adjuster includes a cylindrical concave lens and a cylindrical convex lens which are respectively disposed on an optical path and a lens interval adjusting mechanism for adjusting an interval between the cylindrical concave lends and the cylindrical convex lens by moving at least one of the cylindrical concave lens and the cylindrical convex lens on the optical path.

4. The line narrowed laser apparatus according to claim 1, wherein the exciting source has a pair of mutually opposing discharge electrodes and a power supply circuit for applying a high voltage across the discharge electrodes, wherein the laser gun and the discharge electrodes are provided in an interior of a laser chamber.

5. The line narrowed laser apparatus according to claim 2, wherein the exciting source has a pair of mutually opposing discharge electrodes and a power supply circuit for applying a high voltage across the discharge electrodes, wherein the laser medium and the discharge electrodes are provided in an interior of a laser chamber.

6. The line narrowed laser apparatus according to claim 3, wherein the exciting source has a pair of mutually opposing discharge electrodes and a power supply circuit for applying a high voltage across the discharge electrodes, wherein the laser medium and the discharge electrodes are provided in an interior of a laser chamber.

7. The line narrowed laser apparatus according to claim 4, wherein the discharge electrodes, the angle dispersion-type optical element, and the wavefront adjuster are disposed such that a wavefront dispersing plane of the wavelength dispersive element is perpendicular to a discharging direction between the discharge electrodes, and such that a straight line connecting apexes of cylindrical surfaces of the wavefront adjuster is parallel to the discharging direction between the discharge electrodes.

8. The line narrowed laser apparatus according to claim 5, wherein the discharge electrodes, the angle dispersion-type optical element, and the wavefront adjuster are disposed such that a wavefront dispersing plane of the wavelength dispersive element is perpendicular to a discharging direction between the discharge electrodes, and such that a straight line connecting apexes of cylindrical surfaces of the wavefront adjuster is parallel to the discharging direction between the discharge electrodes.

9. The line narrowed laser apparatus according to claim 6, wherein the discharge electrodes, the angle dispersion-type optical element, and the wavefront adjuster are disposed such that a wavefront dispersing plane of the wavelength dispersive element is perpendicular to a discharging direction between the discharge electrodes, and such that a straight line connecting apexes of cylindrical surfaces of the wavefront adjuster is parallel to the discharging direction between the discharge electrodes.

10. A line narrowed laser apparatus comprising:
    a laser medium;
    an exciting source for exciting the laser medium;
    an optical resonator having a wavelength dispersing element disposed on a rear side of the laser medium and a partial transmission-type output coupler which is disposed on a front side of the laser medium; and
    a reflection mirror constituting a part of the optical resonator, the reflection mirror functioning as a wavefront adjuster disposed on on an optical axis between the laser medium and the partial transmission-type output coupler, said wavefront adjuster receiving light in a form of a spherical wave from a side of the laser medium, adjusting a wavefront of the light in the form of the spherical wave, and outputting the light having the wavefront adjusted to a side of the partial transmission-type coupler to thereby obtain a desired spectral purity.

11. The line narrowed laser apparatus according to claim 1, further comprising a beam correction module disposed on the optical axis on a front side of the optical resonator, for varying a beam divergence of the light output from the optical resonator.

12. The line narrowed laser apparatus of claim 1 wherein the desired spectral purity width is E95.

* * * * *